(12) United States Patent
Maltsev et al.

(10) Patent No.: US 9,516,563 B2
(45) Date of Patent: Dec. 6, 2016

(54) APPARATUS, SYSTEM AND METHOD OF HANDOVER OF A BEAMFORMED LINK

(71) Applicant: Intel Corporation, Santa Clara, CA (US)

(72) Inventors: Alexander Maltsev, Nizhny Novgorod (RU); Ali S. Sadri, San Diego, CA (US); Vadim Sergeyev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 150 days.

(21) Appl. No.: 13/869,575

(22) Filed: Apr. 24, 2013

(65) Prior Publication Data

US 2014/0204902 A1  Jul. 24, 2014

Related U.S. Application Data

(60) Provisional application No. 61/754,720, filed on Jan. 21, 2013.

(51) Int. Cl.
*H04W 36/00* (2009.01)

(52) U.S. Cl.
CPC .............................. *H04W 36/0083* (2013.01)

(58) Field of Classification Search
None
See application file for complete search history.

(56) References Cited

U.S. PATENT DOCUMENTS

| | | | |
|---|---|---|---|
| 5,809,422 A * | 9/1998 | Raleigh et al. | 455/449 |
| 6,108,323 A * | 8/2000 | Gray | 370/335 |
| 6,246,874 B1 * | 6/2001 | Voce | H04B 7/18541 |
| | | | 455/13.1 |
| 6,259,918 B1 * | 7/2001 | Labonte | H04B 7/0408 |
| | | | 455/436 |
| 8,229,418 B2 * | 7/2012 | Mori | H04W 16/28 |
| | | | 370/331 |
| 9,204,358 B2 * | 12/2015 | Randriamasy | H04W 36/32 |
| 2002/0105928 A1 * | 8/2002 | Kapoor et al. | 370/334 |
| 2006/0084474 A1 * | 4/2006 | Iacono | H04W 16/28 |
| | | | 455/562.1 |

(Continued)

FOREIGN PATENT DOCUMENTS

| | | |
|---|---|---|
| KR | 10-2008-0074419 | 8/2008 |
| WO | 9750272 | 12/1997 |

OTHER PUBLICATIONS

International Search Report and Written Opinion for PCT Patent Application No. PCT/US2014/012204, mailed on May 19, 2014, 8 pages.

(Continued)

*Primary Examiner* — Donald Mills
(74) *Attorney, Agent, or Firm* — Shichrur & Co.

(57) ABSTRACT

Some demonstrative embodiments include devices, systems and/or methods of handover of a wireless beamformed link. For example, an apparatus may include a wireless communication unit to communicate between a wireless communication node and a mobile device via a beamformed link between the wireless communication node and the mobile device, the wireless communication unit is to determine a handover candidate for handing over the mobile device, based on at least one beamforming parameter of the beamformed link.

30 Claims, 8 Drawing Sheets

(56) References Cited

U.S. PATENT DOCUMENTS

| | | | |
|---|---|---|---|
| 2006/0194593 A1* | 8/2006 | Drabeck et al. | 455/456.5 |
| 2006/0229070 A1* | 10/2006 | de La Chapelle | H01Q 1/28 455/431 |
| 2009/0061921 A1* | 3/2009 | Eom et al. | 455/522 |
| 2009/0111469 A1 | 4/2009 | Lee et al. | |
| 2009/0116399 A1* | 5/2009 | Ho et al. | 370/252 |
| 2010/0202356 A1* | 8/2010 | Fischer et al. | 370/328 |
| 2011/0182230 A1 | 7/2011 | Ohm et al. | |
| 2011/0281585 A1 | 11/2011 | Kwon et al. | |
| 2013/0143578 A1* | 6/2013 | Lekutai | 455/444 |
| 2013/0194950 A1* | 8/2013 | Haghighat et al. | 370/252 |
| 2013/0235807 A1* | 9/2013 | Lee et al. | 370/329 |

OTHER PUBLICATIONS

WiGig MAC and PHY Specification; Version 1.1; Apr. 2011—Final Specification. pp. 1-442.

IEEE Std 802.11™-2012 (Revision of IEEE Std 802.11-2007) IEEE Standard for Information technology—Telecommunications and information exchange between systems Local and metropolitan area networks—Specific requirements Part 11: Wireless LAN Medium Access Control (MAC) and Physical Layer (PHY) Specifications Mar. 29, 2012, pp. 1-2793.

IEEE Std 802.11ad™-2012 (Amendment to IEEE Std 802.11™-2012, as amended by IEEE Std 802.11ae™-2012 and IEEE Std 802.11aa™-2012) EEE Standard for Information technology—Telecommunications and information exchange between systems Local and metropolitan area networks—Specific requirements Part 11: Wireless LAN Medium Access Control (MAC) and Physical Layer (PHY) Specifications Dec. 28, 2012, pp. 1-628.

ETSI TS 136 300 V11.3.0 (Nov. 2012): LTE; Evolved Universal Terrestrial Radio Access (EUTRA) and Evolved Universal Terrestrial Radio Access Network (E-UTRAN); Overall description; Stage 2 (3GPP TS 36.300 version 11.3.0 Release 11), Nov. 2012, pp. 1-217.

International Preliminary Report on Patentability and Written Opinion for International Application No. PCT/US2014/012204, mailed on Jul. 30, 2015, 7 pages.

Search Report for European Patent Application No. 14740813.2 mailed on Jul. 8, 2016, 10 pages.

Sanchis P. et al, 'Experimental demonstration of a direction of arrival estimation algorithm for mm-wave broadband communication systems', 2003 IEEE MTT-S International Microwave Symposium Digest.(IMS 2003). Philadelphia, PA, Jun. 8-13, 2003; Jun. 8, 2003, pp. 1533-1536.

Rajagopal S et al, 'Antenna Array Design for Multi-Gbps mmWave Mobile Broadband Communication', Global Telecommunications Conference (GLOBCOM 2011), Dec. 5, 2011, 6 pages.

\* cited by examiner

APPARATUS, SYSTEM AND METHOD OF HANDOVER OF A BEAMFORMED LINK

CROSS REFERENCE

This Application claims the benefit of and priority from U.S. Provisional Patent Application No. 61/754,720 entitled "Apparatus, System and Method of Handover of A Beamformed Link", filed Jan. 21, 2013, the entire disclosure of which is incorporated herein by reference.

TECHNICAL FIELD

Embodiments described herein generally relate to handover of a beamformed link formed by an antenna array.

BACKGROUND

Some wireless communication systems may communicate over the Millimeter wave (mmWave) frequency band, e.g., the 60 GHz Frequency band. A mmWave propagation has a few major distinctive features in comparison with lower frequency bands, e.g., the frequency bands of 2.4-5 GHz. For example, the mmWave propagation may have a propagation loss greater than the propagation loss in the lower frequency bands, and may have Quasi-optical propagation properties.

A mmWave communication system may use high-gain directional antennas to compensate for large path loss and/or employ beam-steering techniques. Design of appropriate antenna system and/or further signal processing may be an important aspect of mmWave communication system development.

Multi-element phased antenna arrays may be used, for example, for creation of a directional antenna pattern. A phased antenna array may form a directive antenna pattern or a beam, which may be steered by setting appropriate signal phases at the antenna elements.

A handover process may be utilized for handing-over a session between a base station and a mobile device. The handover may often be time-consuming, e.g., due to necessity in performing signal quality measurement and/or making a decision for handing over the mobile device. The delays for such handovers may reduce the throughput performance and/or may delay the handover procedure.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
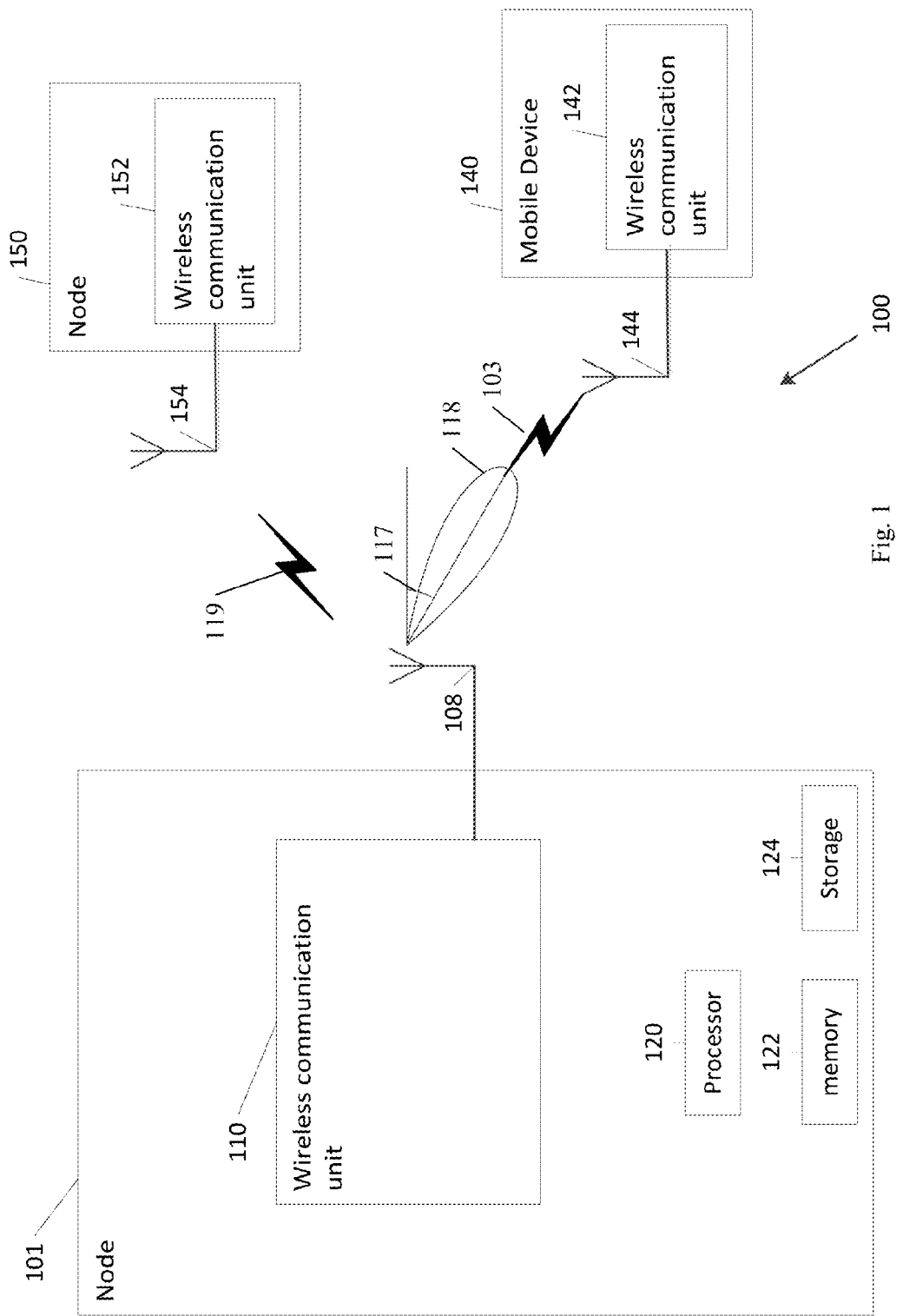
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11 *task group ac* (*TGac*) ("*IEEE*802.11-09/0308*r*12—*TGac Channel Model Addendum Document*"); *IEEE* 802.11 *task group ad* (*TGad*) (*IEEE P*802.11*ad Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 20 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "mmWave frequency band" as used herein may relate to a frequency band above 20 GHz, e.g., a frequency band between 20 GHz and 300 GHz.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the mmWave or DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

The term "cell", as used herein, may include a combination of network resources, for example, downlink and optionally uplink resources. The resources may be controlled and/or allocated, for example, by a wireless communication node (also referred to as a "node" or a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM). For example, system 100 may include one or more wireless communication nodes, e.g., including nodes 101 and 150, and one or more mobile devices, e.g., including mobile device 140. The wireless medium may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, one or more elements of system 100 may perform the functionality of a Heterogeneous Network (HetNet), which may utilize a deployment of a mix of technologies, frequencies, cell sizes and/or network architectures, for example, including cellular, mmWave, and/or the like, e.g., as described below.

In one example, the HetNet may be configured to provide a service through a first wireless communication environment, e.g., WLAN, and to maintain the service when switching to another communication environment, e.g., a cellular network. The HetNet architecture may enable utilizing a mixture of wireless communication environments, e.g., a mmWave environment and a cellular environment, for example, to optimally respond to rapid changes in customer demand, reduce power consumption, reduce cost, increase efficiency and/or achieve any other benefit.

In some demonstrative embodiments, node 101, node 150 and mobile device 140 may form and/or communicate as part of one or more wireless communication networks. For example, node 101 and mobile device 140 may form and/or may communicate as part of a wireless communication cell, e.g., as described below.

In some demonstrative embodiments, nodes 101 and/or 150 may include or may perform the functionality of a Base Station (BS), an Access Point (AP), a WiFi node, a Wimax node, a cellular node, e.g., an Evolved Node B (eNB), a station, a hot spot, a network controller, and the like.

In some demonstrative embodiments, mobile device 140 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, node 101, node 150 and/or mobile device 140 may include one or more wireless communication units to perform wireless communication between node 101, node 150 and/or mobile device 140 and/or with one or more other wireless communication devices, e.g., as described below. For example, node 101 may include a wireless communication unit 110, node 150 may include a wireless communication unit 152 and/or mobile device 140 may include a wireless communication unit 142.

In some demonstrative embodiments, wireless communication units 110, 152 and 142 may include, or may be associated with, one or more antennas. In one example, wireless communication unit 110 may be associated with at least one antenna array 108; wireless communicate unit 152 may be associated with one or more antennas 154; and/or wireless communication unit 142 may be associated with one or more antennas 144.

Antennas 108, 154 and/or 144 may include any type of antennas suitable for transmitting and/or receiving wireless communication signals, blocks, frames, transmission streams, packets, messages and/or data. For example, antennas 108, 154 and/or 144 may include any suitable configuration, structure and/or arrangement of one or more antenna elements, components, units, assemblies and/or arrays. Antennas 108, 154 and/or 144 may include, for example, antennas suitable for directional communication, e.g., using beamforming techniques. For example, antennas 108, 154 and/or 144 may include a phased array antenna, a multiple element antenna, a set of switched beam antennas, and/or the like. In some embodiments, antennas 108, 154 and/or 144 may implement transmit and receive functionalities using separate transmit and receive antenna elements. In some embodiments, antennas 108, 154 and/or 144 may implement transmit and receive functionalities using common and/or integrated transmit/receive elements.

In some demonstrative embodiments, nodes 101 and/or 150 and/or mobile device 140 may also include, for example, one or more of a processor 120, a memory unit 122, and a storage unit 124. Nodes 101 and/or 150 and/or mobile device 140 may optionally include other suitable hardware components and/or software components. In some demonstrative embodiments, some or all of the components of node 101 may be enclosed in a common housing or packaging, and may be interconnected or operably associated using one or more wired or wireless links. In other embodiments, components of node 101 may be distributed among multiple or separate devices.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of node 101 and/or of one or more suitable applications.

Memory unit 122 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 124 includes, for example, a hard disk drive, a floppy disk drive, a Compact Disk (CD) drive, a CD-ROM drive, a DVD drive, or other suitable removable or non-removable storage units. Memory unit 122 and/or storage unit 124, for example, may store data processed by node 101.

In some demonstrative embodiments, antenna array 108 may include a plurality of antenna elements, e.g., as described below. The plurality of antenna elements of the antenna array may be configured, for example, for creation of a highly-directional antenna patterns. The plurality of antenna elements may include, for example, about 16-36 antenna elements, or any other number of antenna elements, which may be placed in a predefined geometry. The plurality of antenna elements may be configured to form one or more highly directive antenna patterns or beams, which may be steered by setting appropriate signal phases at the antenna elements, e.g., as described below.

In some demonstrative embodiments, wireless communication unit 110 may be configured to control antenna array 108 to generate and steer the plurality of beams to be directed to a plurality of other devices, e.g., including node 150 and mobile device 140. Wireless communication unit 110 may communicate with the plurality of other devices via a plurality of wireless communication links over the plurality of beams formed by antenna array 108, as described in detail below.

In some demonstrative embodiments, one or more elements of system 100 may utilize the mmWave communication band to provide wireless connectivity for a relatively large coverage area. In one example, elements of system 100 may be deployed, for example, in outdoor spaces, e.g., a street, a stadium, and the like, and/or large indoor areas, e.g., conference halls, and the like.

For example, system 100 may include a plurality of small cells, e.g., a large number of small cells, which may be deployed to cover the large coverage area, e.g., as described below with reference to FIG. 3. A cell may include a wireless communication node, e.g., a BS, which may be configured to cover and/or serve a relatively small number of users, for example, mobile devices, e.g., User Equipment (UE), and the like. The deployment of the small cells may provide, for example, high-speed wireless access for communication by many users, e.g., simultaneously.

In one example, a first cell may include node 101, which may serve one or more users, e.g., including mobile device 140; and a second cell may include node 150, which may serve one or more users (not shown in FIG. 1).

In some demonstrative embodiments, wireless communication node 101 may communicate with the mobile devices of the first cell via a plurality of wireless communication links ("access links"). For example, wireless communication node 101 may communicate with mobile device 140 via a wireless access link 103. Wireless access link 103 may include a downlink for communicating downlink data from wireless communication node 101 to mobile device 140 and/or an uplink for communicating uplink data from mobile device 140 to wireless communication node 101.

In some demonstrative embodiments, backhaul links may be utilized for communication between the wireless communication nodes. For example, wireless communication node 101 may communicate with wireless communication node 150 via a wireless backhaul link 119.

In some demonstrative embodiments, the backhaul links may be utilized for direct or indirect communication between the wireless communication nodes.

In some demonstrative embodiments, the backhaul links, e.g., backhaul link 119, may include high-throughput links, which may be configured to communicate high throughput data between the wireless communication nodes.

In some demonstrative embodiments, the wireless backhaul links, e.g., wireless backhaul link 119, may be utilized, for example, for systems including a relatively high density of nodes per area unit.

In some demonstrative embodiments, utilizing separate antenna systems at a node of system 100 for access and backhaul, e.g., one or more antenna arrays dedicated for communication over backhaul links and one or more other antenna arrays dedicated for communication over access links, may be beneficiary in some aspects. For example, utilizing separate antenna systems at a node for access and backhaul may limit interference in an environment, e.g., since directional antenna arrays may be utilized for directional backhaul links; and/or may enable using different types of antennas, for example, for forming the access and backhaul links in different frequency bands.

However, in some demonstrative embodiments, a node, e.g., a mmWave node, implementing separate antennas for access and backhaul, e.g., over the mmWave band, may be bulky, expensive, complex and/or inefficient.

In some demonstrative embodiments, one or more wireless communication nodes of system 100, e.g., wireless communication node 101, may utilize a common antenna array for communicating over both one or more backhaul links, e.g., backhaul link 119, and one or more access links, e.g., access link 103, as described below.

In other embodiments a device, e.g., a node or any other suitable device, may include a plurality of common antenna arrays, e.g., each configured to communicate over both the access and backhaul links.

In some demonstrative embodiments, high throughputs of the access links may require comparable high throughput backhaul links. Accordingly, it may be beneficiary to implement the backhaul links, e.g., backhaul link 119, in the mmWave band as well.

In other embodiments the backhaul links may include wired links and/or wireless links. The wireless backhaul links may utilize one or more antenna arrays in common with the access links and/or one or more antenna arrays dedicated for the backhaul links.

In some demonstrative embodiments, one or more wireless communication nodes of system 100, e.g., wireless communication node 101, may be configured for providing enough range and flexibility for access and backhaul applications.

In some demonstrative embodiments, antenna array 108 may be configured to create multiple beams carrying different information. Accordingly, wireless communication node 101 may be configured to simultaneously communicate with a plurality of wireless communication nodes and/or mobile devices, e.g., utilizing a Multi-User (MU) Multi-Input-Multi-Output (MIMO) communication mode, e.g., as described below.

In some demonstrative embodiments, antenna array 108 may include an antenna array having a relatively increased antenna aperture for providing the range and the flexibility for communicating with the plurality of wireless communication nodes and/or the mobile devices. For example, antenna array 108 may include a large circular antenna array or a set of linear antenna arrays, configured to cover several sectors, e.g., covering an area around node 101, to communicate, e.g., simultaneously, over backhaul link 119 and access link 103.

In some demonstrative embodiments, antennas 108 may be configured to steer one or more narrow beams in different angles in at least two dimensions, e.g., in both elevation and azimuth.

In one example, wireless communication node 101 may communicate over access link 103 with mobile device 140 via a first beam at a first elevation angle and at a first azimuth angle, and over backhaul link 119 with wireless communication node 150 via a second beam at a second elevation angle and at a second azimuth angle.

In another example, wireless communication node 101 may communicate over access link 103 with mobile device 140 via the first beam at the first elevation angle and at the first azimuth angle, and over backhaul link 119 with wireless communication node 150 via a wired link.

In some demonstrative embodiments, wireless access link 103 may include a direct link, e.g., a P2P link, for example, to enable direct communication between node 101 and mobile device 140.

In some demonstrative embodiments, wireless access link 103 may include a wireless communication link over the mmWave band, e.g., the DMG band.

In some demonstrative embodiments, nodes 101 and/or 150, and/or mobile device 140 may perform the functionality of mmWave STAs, e.g., DMG stations ("DMG STA"). For example, nodes 101 and/or 150, and/or mobile device 140 may be configured to communicate over the DMG band.

In some demonstrative embodiments, wireless access link 103 may include a wireless beamformed link.

In some demonstrative embodiments, wireless access link 103 may include a wireless gigabit (WiGig) link. For example, wireless access link 103 may include a wireless beamformed link over the 60 GHZ frequency band.

In other embodiments, wireless access link 103 and/or wireless backhaul link 119 may include any other suitable link and/or may utilize any other suitable wireless communication technology.

In some demonstrative embodiments, wireless communication unit 110 may control antennas 108 to form access link 103 with mobile device 140.

In some demonstrative embodiments, wireless communication unit 110 may control antenna 108 to generate a directional beam 118 directed in a direction 117 to communicate via wireless access link 103.

In some demonstrative embodiments, wireless communication unit 110 may be configured to communicate via one or more sectors of antenna array 108. For example, wireless communication unit 110 may be configured to communicate via four sectors, e.g., a first sector, a second sector, a third sector, and/or a fourth sector, covering an area around node 101, for example, an area of 360 degrees around node 101, such that each sector covers an area of 90 degrees. For example, the first sector may cover an area between 0 and 90 degrees around node 101, the second sector may cover an area between 90 and 180 degrees around node 101, the third sector may cover an area between 180 and 270 degrees around node 101, and/or the fourth sector may cover an area between 270 and 0 degrees around node 101, e.g., as described below with reference to FIG. 2.

In one example, antenna array 108 may include a plurality of linear antenna arrays, e.g., four linear antenna arrays, configured to cover the four sectors. In another example, antenna array 108 may include a circular antenna array configured to cover the four sectors.

In some demonstrative embodiments, wireless communication unit 110 may be configured to control antennas 108 to steer beam 118 in a direction 117 corresponding to a sector of node 101, e.g., the first sector, the second sector, the third sector, or the fourth sector, to communicate with mobile device 140. For example, wireless communication unit 110 may control antennas 108 to communicate with mobile device 140 over access link 103 via the first sector of node 101, e.g., by steering directional beam 118 in direction 117 between 0 and 90 degrees.

In some demonstrative embodiments, wireless communication unit 110 may control antenna 108 to steer directional beam 118 by configuring beamforming settings of antenna 108.

For example, wireless communication unit 110 may configure the beamforming settings of antenna 108 by adjusting phase shifts to be applied to the antenna elements of antenna 108. Adjusting the phase shifts may enable to determine and/or control a width, gain and/or direction of directional beam 118, e.g., as described below.

In some demonstrative embodiments, wireless communication unit 110 may be configured to obtain and/or to monitor the beamforming settings of antennas 108. For example, wireless communication unit 110 may monitor the beamforming settings of antennas 108 to reconfigure and/or to readjust the beamforming settings of antennas 108.

In some demonstrative embodiments, wireless communication unit 110 may readjust and/or reconfigure the beamforming settings of antenna 108, for example, if a quality of access link 103 is reduced, e.g., upon a movement of mobile device 140.

In some demonstrative embodiments, wireless communication unit 110 may be configured to control and steer directional beam 118 based on a movement of mobile device 140. For example, wireless communication unit 110 may steer directional beam 118 to a direction, e.g., if mobile device 140 is moving to the direction.

In some demonstrative embodiments, wireless communication unit 110 may be configured to track the movement of mobile device 140 and to steer directional beam 118 based on the movement, for example, to maintain the quality of link 103.

In some demonstrative embodiments, wireless communication unit 110 may be configured to control and steer directional beam 118 in an azimuth angle and/or in an elevation angle with respect to node 101. For example, wireless communication unit 110 may steer the azimuth angle of directional beam 118, e.g., if device 140 moves clockwise or counterclockwise with respect to node 101; wireless communication unit 110 may steer the elevation angle of directional beam 118, e.g., if device 140 moves away from or towards node 101; and/or wireless communication unit 110 may steer both the elevation angle and the azimuth angle of directional beam 118, e.g., if device 140 moves upward or downward together with a clockwise or counterclockwise movement with respect to node 101.

In some demonstrative embodiments, a user of mobile device 140 may move mobile device 140 from a first location to a second, e.g., different, location.

In some demonstrative embodiments, the first location may correspond to a coverage area of the first sector of antennas 108, and the second location may correspond to a coverage area of a second, e.g., different, sector of antennas 108.

In some demonstrative embodiments, link 103 may be handed over from the first sector to the second sector of antennas 108 ("inter-sector handover"), for example, if device 140 is moved from the coverage area of the first sector to the coverage area of the second sector.

In some demonstrative embodiments, the first location may be in a coverage area of a first node, e.g., node 101, and the second location may be in a coverage area of a second, e.g., different, node, e.g., node 150.

In some demonstrative embodiments, link 103 may be handed over from the first node to the second node ("inter-cell handover"), for example, if device 140 is moved from the coverage area of node 101 to the coverage area of node 154.

Utilizing a handover procedure for handing-over link 103 between the first and second sectors and/or the first and second nodes may be time-consuming, e.g., due to the necessity in performing signal quality measurement and/or making a decision of the sector or node to which the mobile device should be associated. The delays for such handovers may reduce the throughput performance and/or may delay the handover procedure in a mmWave network using sectored antennas.

In some demonstrative embodiments, wireless communication unit 110 may be capable of predicting a timing of a potential handover and/or a potential handover candidate, e.g., a sector or a node, to which beamformed link 103 is to be handed over, e.g., as described below.

In some demonstrative embodiments, wireless communication unit 110 may determine a handover candidate for handing over mobile device 140, based on at least one beamforming parameter of link 103.

In one example, the handover candidate may include, for example, a candidate antenna sector of antennas 108 to be used for communicating with mobile device 140, e.g., in an inter-sector handover.

In another example, the handover candidate may include, for example, a candidate node, e.g., node 150, to which link 103 with mobile device 140 may be handed over, e.g., in an inter-cell handover.

In some demonstrative embodiments, the at least one beamforming parameter may include at least one directionality parameter corresponding to a directionality of link 103.

In some demonstrative embodiments, the at least one directionality parameter may include at least one angle parameter of an azimuth angle of link 103 and an elevation angle of link 103. For example, link 103 may be directed to an azimuth of seventy degrees clockwise from the north, and an elevation of thirty degrees with respect to the horizon, e.g., as described below with reference to FIG. 4.

In some demonstrative embodiments, wireless communication unit 110 may determine the handover candidate based on a direction of a change in the directionality parameter.

In one example, wireless communication 110 may determine the handover candidate to be a second sector of antennas 108, in an inter-sector handover, for example, if the direction of change in the directionality parameter is directed towards the second sector, e.g., as described below with reference to FIG. 2.

In another example, wireless communication 110 may determine the handover candidate to be node 150 in an inter-cell handover, for example, if the direction of change in the directionality parameter is directed towards node 150, e.g., as described below with reference to FIG. 3.

In some demonstrative embodiments, wireless communication unit 110 may determine at least one relative-placement parameter relating to a relative placement between node 101 and mobile device 140 based on the beamforming parameter.

For example, wireless communication unit 110 may determine a relative location of device 140 with respect to node 101 based on the directionality parameter of link 103.

In some demonstrative embodiments, the relative-placement parameter may include at least one relative angle between node 101 and mobile device 140.

In some demonstrative embodiments, the relative angle may include at least one angle of an azimuth angle and an elevation angle relative between node 101 and mobile device 140.

In some demonstrative embodiments, wireless communication unit 110 may determine an estimated distance between node 101 and mobile device 140 based on the elevation angle, e.g., as described below with reference to FIG. 4.

In some demonstrative embodiments, wireless communication unit 110 may determine the handover candidate based on the estimated distance.

In one example, wireless communication unit 110 may determine the handover candidate to be a second, e.g., different, sector of node 101, e.g., the second sector, for example, if the estimated distance is inside the boundaries of a coverage area of the second sector.

In another example, wireless communication unit 110 may determine the handover candidate to be another node, e.g., node 150, for example, if the estimated distance exceeds the coverage area of node 101.

In some demonstrative embodiments, wireless communication unit 110 may determine the handover candidate based on a change in at least one angle of link 103.

In one example, wireless communication unit 110 may determine the second sector of node 101, e.g., and not the third or fourth sectors, to be the handover candidate, for example, if the change in the azimuth angle of link 103 is directed towards the second sector, and the estimated distance is inside the boundaries of a coverage area of the second sector, e.g., as described below with reference to FIG. 2.

In another example, wireless communication unit 110 may determine node 150, e.g., and not other wireless communication nodes, to be the handover candidate, for example, if the change in the azimuth angle of link 103 is directed towards node 150 and the estimated distance exceeds the coverage area of node 101, e.g., as described below with reference to FIG. 3.

In some demonstrative embodiments, wireless communication unit 110 may be configured to utilize one or more metrics ("handover prediction metrics") to predict, estimate and/or determine a time ("predicted handover time"), at which link 103 is to be handed over. The metrics may include or may be related to, for example, the at least one relative-placement parameter.

In some demonstrative embodiments, wireless communication unit 110 may estimate a handover time for performing the handover based on the beamforming parameter, e.g., as described below.

In some demonstrative embodiments, wireless communication unit 110 may estimate the handover time for performing the handover based on a rate of a change in the directionality of link 103.

In some demonstrative embodiments, wireless communication unit 110 may estimate the handover time for performing the handover based on a rate of a change in at least one angle of link 103.

In one example, wireless communication unit 110 may estimate the handover time between the first sector and the second sector of antennas 108 based on an angular velocity of an azimuth change of the azimuth angle of link 103. For example, wireless communication unit 110 may calculate an angular velocity of the azimuth angle of link 103 and may estimate, based on the angular velocity, when link 103 is assumed to cross the border line between the first and second sectors of antennas 108, e.g., as described below with reference to FIG. 2.

In another example, wireless communication unit 110 may estimate the handover time for handing-over mobile device 140 between node 101 and node 150, e.g., based on an angular velocity of an elevation change of the elevation angle of link 103. For example, wireless communication unit 110 may estimate a rate of change in a relative distance between mobile device 140 and node 101 based on the angular velocity of the elevation angle of link 103. Wireless communication unit 110 may estimate when mobile device 140 is assumed to cross from a coverage area of node 101 to a coverage area of node 150 based on the estimated angular velocity, e.g., as described below with reference to FIG. 4.

In some demonstrative embodiments, wireless communication unit 110 may inform the other node, e.g., node 150, that beamforming training may be performed between mobile device 140 and the other node.

In some demonstrative embodiments, wireless communication unit 110 may inform node 150 via backhaul link 119 about the handover process. In other embodiments, wireless communication unit 110 may inform node 150 via any other wired or wireless communication about the handover process. For example, wireless communication unit 110 may transmit to wireless communication unit 152, e.g., via backhaul link 119, handover information for handing over mobile device 140 to node 150.

In one example, the handover information may include an identity of mobile device 140, e.g., a MAC address of device 140, or any other identification of mobile device 140.

In some demonstrative embodiments, node 101 may communicate with node 150 information with respect to one or more parameters of resources required to establish a wireless beamformed link between node 150 and mobile device 140, e.g., a time interval of the link, a frequency range of the link, and/or a time-frequency window of the link.

In some demonstrative embodiments, node 101 may inform mobile device 140 about the handover process via link 103. For example, wireless communication unit 110 may transmit to device 140 handover information for handing over mobile device 140 to node 150.

In one example, the handover information may include an identity of node 150, e.g., a MAC address of node 150, or any other identification of node 150, and the one or more resources parameters to establish the wireless beamformed link between node 150 and mobile device 140.

In some demonstrative embodiments, wireless communication unit 110 may initialize the handover of mobile device 140 to the handover candidate.

In some demonstrative embodiments, wireless communication unit 110 may initialize the handover of mobile device 140 between the first sector and the second sector, e.g., prior to mobile device 140 crossing the borderline between the first and second sectors.

In some demonstrative embodiments, wireless communication unit 110 may adjust and/or configure the beamforming settings of antenna 108 prior to mobile device 140 crossing the borderline between the first and second sectors. For example, wireless communication unit 110 may adjust the beamforming settings of antenna 108 from communicating via the first sector to communicating via the second sector.

In some demonstrative embodiments, wireless communication unit 110 may initialize the handover of mobile device 140 to node 150, e.g., prior to mobile device 140 entering to the coverage area of node 150.

In some demonstrative embodiments, wireless communication unit 152 may adjust and/or configure the beamforming settings of antennas 154 prior to mobile device 140 crossing the borderline between the coverage area of node 101 and the coverage area of node 150. For example, wireless communication unit 152 may adjust beamforming settings of antennas 154 for communicating with mobile device 140 upon mobile device 140 entering the coverage area of node 150.

In some demonstrative embodiments, predicting the handover time and/or the handover candidate may allow, for example, substantial reduction of the time required for performing the handover and/or substantial reduction of the computational effort required by a mobile device for performing the handover, thereby reducing, for example, a power consumption of the mobile device.

Figure 2:
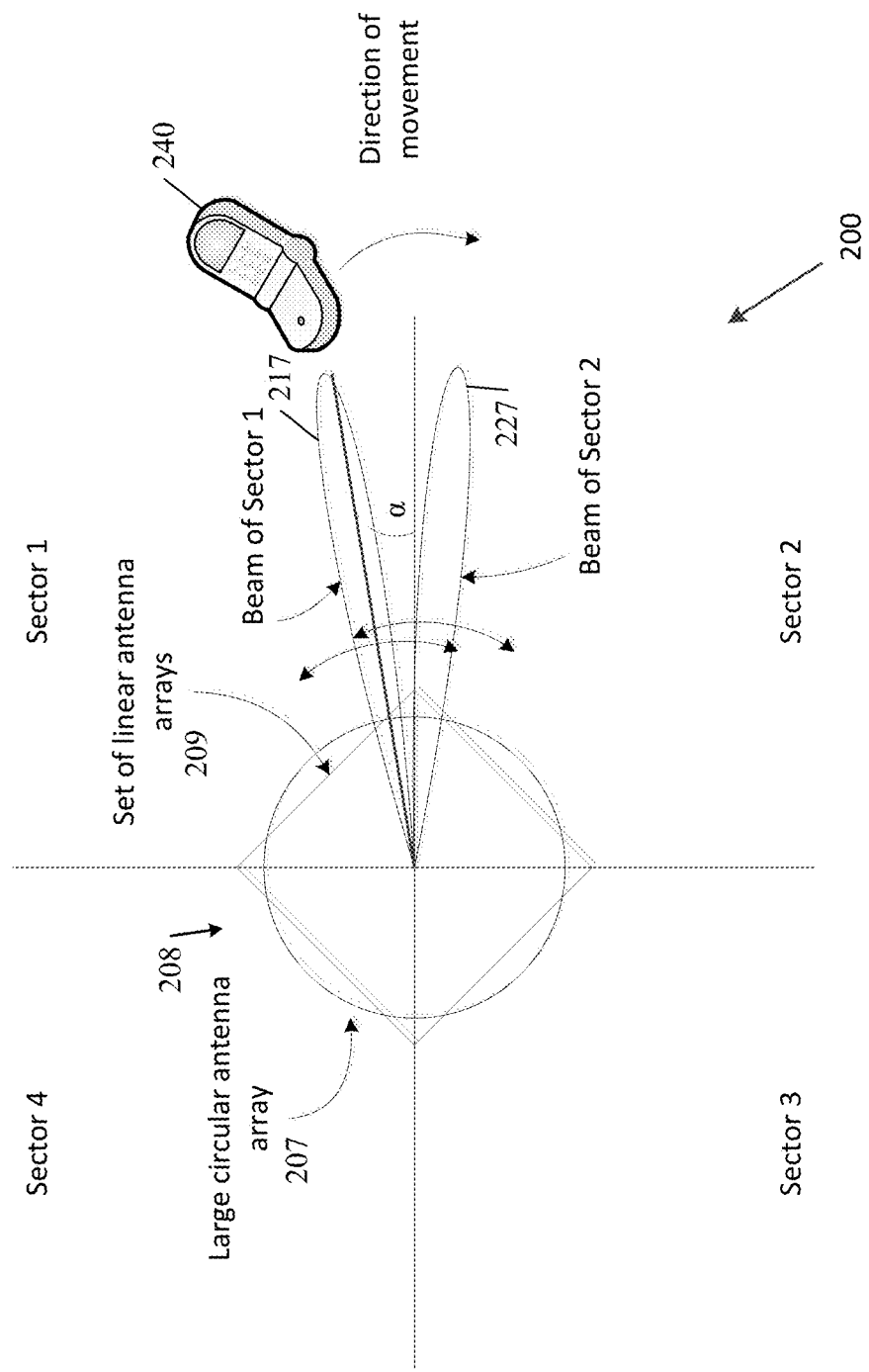
FIG. 2 is a schematic illustration of an inter-sector handover scheme, in accordance with some demonstrative embodiments.

Reference is made to FIG. 2, which schematically illustrates an inter-sector handover scheme 200, in accordance with some demonstrative embodiments.

In some demonstrative embodiments, inter-sector handover scheme 200 may be utilized by a wireless communication unit utilizing an antenna array 208 covering four sectors, denoted Sector 1, Sector 2, Sector 3 and Sector 4, to communicate with a mobile device 240. For example, antenna 208 may perform the functionality of antennas 108 (FIG. 1), and/or mobile device 240 may perform the functionality of mobile device 140 (FIG. 1). In other embodiments, antenna array 208 may cover any other number of sectors, e.g., 3 sectors, 6 sectors, and the like.

As shown in FIG. 2, Sector 1 may cover an area between 0 and 90 degrees around antenna array 208, Sector 2 may cover an area between 90 and 180 degrees around antenna array 208, Sector 3 may cover an area between 180 and 270 degrees around antenna array 208, and/or Sector 4 may cover an area between 270 and 0 degrees around antenna array 208.

In some demonstrative embodiments, node 101 (FIG. 1) may utilize antenna array 208 to communicate with mobile device 240 via a directional beam 217. For example, directional beam 217 may perform the functionality of directional beam 118 (FIG. 1).

As shown in FIG. 2, in one example, antenna array 208 may include a large circular antenna array 209 to communicate with mobile device 240. For example, node 101 (FIG. 1) may utilize large circular antenna array 209 to direct beam 217 to one or more sectors of the four sectors.

As also shown in FIG. 2, in another example, antenna array 208 may include set of linear antenna arrays 207 to communicate with mobile device 240. For example, each linear antenna array of the set of linear antenna arrays 207 may cover a sector of Sectors 1, 2, 3 and 4.

In some demonstrative embodiments, node 101 (FIG. 1) may keep track of a relative positioning between mobile device 240 and antenna 208.

In some demonstrative embodiments, node 101 (FIG. 1) may monitor an azimuth angle, denoted α, of directional beam 217 representing an azimuth between mobile device 240 and antenna 208.

In some demonstrative embodiments, node 101 (FIG. 1) may be configured to control the azimuth angle α of directional beam 217, e.g., as described above.

In some demonstrative embodiments, node 101 (FIG. 1) may be capable of obtaining and monitoring the azimuth angle α, for example, from the beamforming settings used by node 101 (FIG. 1) to communicate with mobile device 240.

In some demonstrative embodiments, node 101 (FIG. 1) may determine, e.g., based on the azimuth angle α, when mobile device 240 is about to move from a first sector ("the current sector") to a second sector ("the new sector").

In some demonstrative embodiments, node 101 (FIG. 1) may be configured to determine the identity of the new sector, e.g., based on the azimuth angle α.

In some demonstrative embodiments, node 101 (FIG. 1) may be capable of using the information regarding the new sector and a predicted handover time to prepare antenna array 208, e.g., in advance, for communicating with mobile device 240 upon handover. For example, node 101 (FIG. 1) may prepare beamforming settings of a directional beam 227 for communicating with mobile device 240 upon handover of device 240 from Sector 1 to Sector 2.

As shown in FIG. 1, for example, node 101 (FIG. 1) may be communicating with mobile device 240 via directional beam 217 in Sector 1. By monitoring the azimuth angle α between node 101 (FIG. 1) and mobile device 240, node 101 (FIG. 1) may predict a time at which mobile device 240 is predicted to move from the coverage area of Sector 1 into the coverage area of Sector 2. For example, node 101 (FIG. 1) may detect a change of the azimuth angle α from a first azimuth angle covered by Sector 1 towards a second azimuth angle covered by Sector 2.

In some demonstrative embodiments, node 101 (FIG. 1) may determine a rate of change of the azimuth angle, e.g., based on a relationship between the change in the azimuth angle and a time period during which the change in the azimuth angle is measured.

In some demonstrative embodiments node 101 (FIG. 1) may predict the handover time, at which mobile device 240 is predicted to move into the coverage area of Sector 2. Node 101 (FIG. 1) may prepare, e.g., in advance, a beamforming setting of directional beam 227 of Sector 2 to communicate with mobile device 240.

Additionally or alternatively, in some demonstrative embodiments, node 101 (FIG. 1) may be configured to utilize the azimuth angle α to predict the inter-cell handover of mobile device 240, e.g., as described below with reference to FIG. 3.

Figure 3:
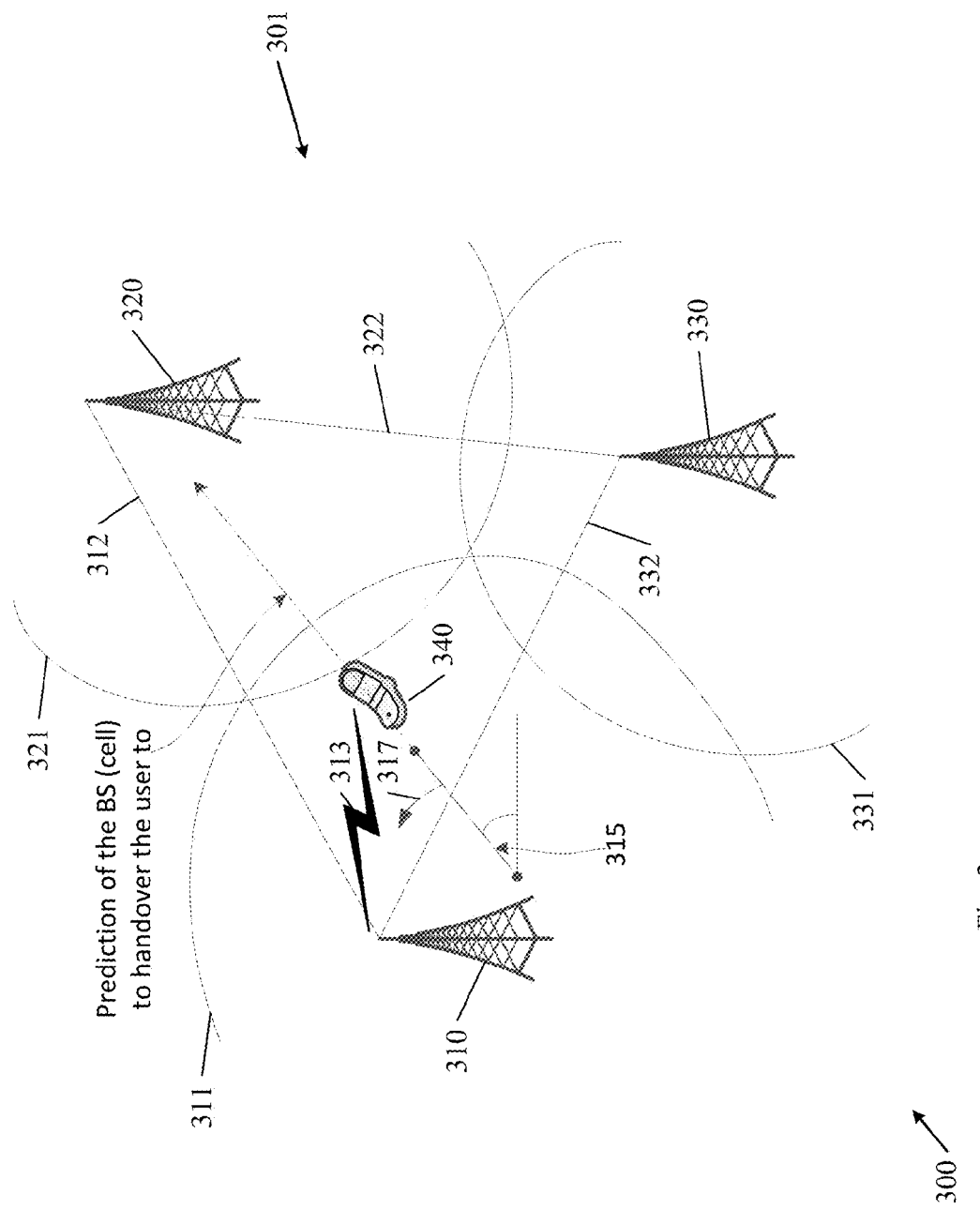
FIG. 3 is a schematic illustration of an inter-cell handover scheme, in accordance with some demonstrative embodiments.

Reference is made to FIG. 3, which schematically illustrates an inter-cell handover scheme 300 for handing over a mobile device 340 within a multi-cell wireless communication system 301, in accordance with some demonstrative embodiments.

In some demonstrative embodiments, system 301 may include a plurality of wireless communication nodes configured to form a plurality of cells, e.g., small cells, for communicating with one or more mobile devices. For example, system 301 may include a wireless communication node 310 to form cell 311; a wireless communication node 320 to form cell 321; and/or a wireless communication node 330 to form cell 331. For example, wireless communication nodes 310, 320 and/or 330 may perform the functionality of node 101 (FIG. 1).

In some demonstrative embodiments, wireless communication nodes 310, 320 and/or 330 may include one or more BSs. However, in other embodiments, the wireless communication system may include, additionally or alternatively, any other type of wireless communication device, for example, a station, a node, an access point, a hot spot, a network controller, and the like.

In some demonstrative embodiments, wireless communication node 310 may be configured to communicate with one or more mobile devices within cell 311 via one or more first wireless communication access links; wireless communication node 320 may be configured to communicate with one or more mobile devices within cell 321 via one or more second wireless communication access links; and/or wireless communication node 330 may be configured to communicate with one or more mobile devices within cell 331 via one or more third wireless communication access links.

In some demonstrative embodiments, wireless communication nodes 310, 320 and/or 330 may be configured to communicate with mobile device 340 over a wireless beamformed link. For example, mobile device 340 may perform the functionality of mobile device 140 (FIG. 1).

In some demonstrative embodiments, mobile device 340 may include a UE, for example, a Smartphone, a notebook, a laptop, and the like.

In some demonstrative embodiments, one or more elements of system 301 may utilize the mmWave communication band to provide wireless connectivity for a relatively large coverage area, e.g., a coverage area of cells 311, 321 and/or 331. In one example, elements of system 301 may be deployed, for example, in outdoor spaces, e.g., a street, a stadium, and the like, and/or large indoor areas, e.g., conference halls, and the like. For example, system 301 may include a large number of small cells, which may be deployed to cover the large coverage area.

In some demonstrative embodiments, wireless communication nodes 310, 320 and/or 330 may be configured to form one or more wireless communication backhaul links for wirelessly communicating information, e.g., backhaul information, between wireless communication nodes 310, 320 and/or 330.

In one example, wireless communication node 310 may communicate with wireless communication node 320 over a wireless backhaul link 312 formed between node 310 and node 320; wireless communication node 320 may communicate with wireless communication node 330 over a wireless backhaul link 322 formed between node 320 and node 330; and/or wireless communication node 330 may communicate with wireless communication node 310 over a wireless backhaul link 332 formed between node 330 and node 310.

As shown in FIG. 3, node 310 may communicate with mobile device 340, which may be located within cell 311, over a beamformed access link 313.

In some demonstrative embodiments, node 310 may determine a direction between node 310 and mobile device 340 based on an azimuth angle 315 of link 313.

In some demonstrative embodiments, node 310 may determine one or more angles between nodes 310, 320 and/or 330, for example, based on azimuth angles of the backhaul links 312, 322, and/or 332. For example, node 310 may determine an azimuth angle between nodes 310 and 320 based on the azimuth angle of backhaul link 312.

In some demonstrative embodiments, node 310 may determine a candidate node to which mobile device 340 may be potentially handed over, for example, based on the azimuth angle 315 of the mobile device, based on a rate of change of the azimuth angle 315 of the mobile device and/or based on a comparison between the azimuth angle of the mobile device and the azimuth angles of nodes 310, 320 and/or 330.

For example, as shown in FIG. 3, the azimuth angle 315 of the mobile device 340 may change in a direction 317 towards the azimuth angle of node 320. Accordingly, node 310 may predict that the mobile device 340 may be expected to be handed over to node 320. Node 310 may also be able to predict the expected handover time, for example, based on the rate of change of the azimuth angle 315.

In some demonstrative embodiments, node 310 may utilize one or more additional or alternative handover prediction metrics to predict one or more aspects of a handover of the mobile device.

In one example, node 310 may utilize an elevation angle of mobile device 340, to predict a handover of mobile device 340, e.g., as described below.

Figure 4:
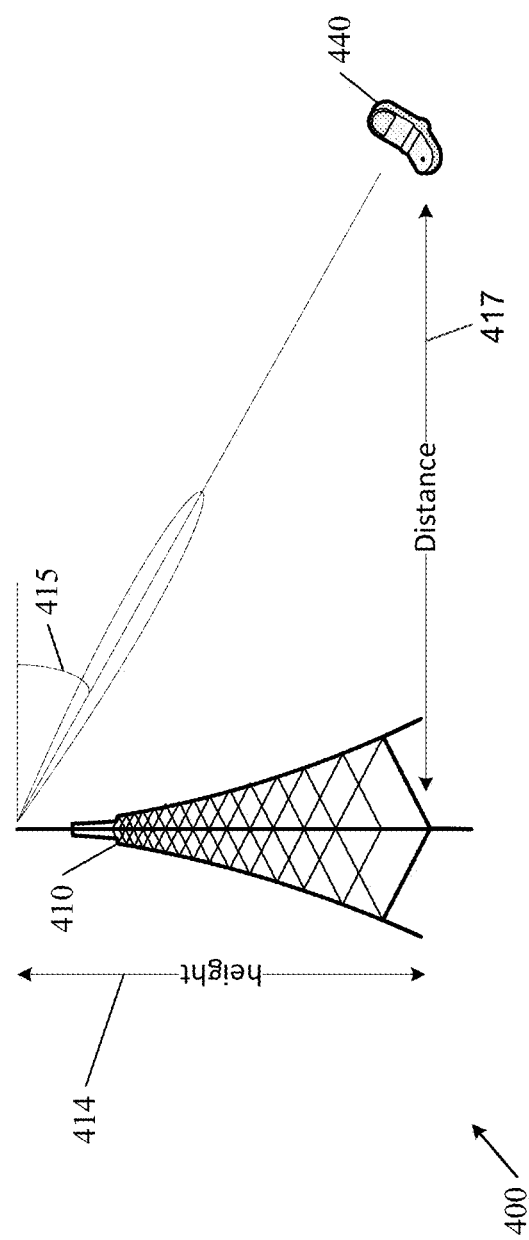
FIG. 4 is a schematic illustration of an estimation scheme for estimating a distance between a mobile device and a wireless communication node, in accordance with some demonstrative embodiments.

Reference is made to FIG. 4, which schematically illustrates an estimation scheme 400 to estimate a distance 417 between a mobile device 440 and a wireless communication node 410, in accordance with some demonstrative embodiments. For example, wireless communication node 101 (FIG. 1) may utilize estimation scheme 400 to estimate a distance between node 101 (FIG. 1) and mobile device 140 (FIG. 1).

In some demonstrative embodiments, node 410 may estimate distance 417 based on an elevation angle 415 of mobile device 440.

In some demonstrative embodiments, node 410 may determine the estimated distance 417, between node 410 and mobile device 440, based on an elevation angle 415 of mobile device 440, e.g., as follows:

$$D=h*ctg(alpha) \quad (1)$$

wherein h denotes a height 414 of a tower of node 410, D denotes the estimated distance 417, alpha denotes the elevation angle 415, and ctg denotes the cotangent function.

Referring back to FIG. 3, in some demonstrative embodiments, node 310 may determine, based on the azimuth angle 315 and/or the elevation angle 415 (FIG. 4), whether the mobile device 340 is moving out of the coverage area of cell 311 of node 310 and towards the coverage area of another node, e.g., node 320 or node 330.

For example, node 310, may determine that mobile device 340 is moving towards the coverage area of cell 321 of node 320, for example, if azimuth angle 315 changes in a direction towards node 320 and the elevation angle 415 (FIG. 4) indicates that mobile device 340 is moving out of the coverage area of cell 311 and into the coverage area of cell 321 of node 320.

In some demonstrative embodiments, node 310 may determine that mobile device 340 is moving towards the coverage area of the other node, and the distance between node 310 and mobile device 340, e.g., distance 417 (FIG. 4), is such that the mobile device 340 is likely to move into the coverage area of the other node.

In some demonstrative embodiments, node 310 may instruct the other node, e.g., node 320, for example, via the backhaul link, e.g., backhaul link 312, to perform antenna training with the mobile device 340, e.g., in advance of the actual crossing over of mobile device 340 into the coverage area of cell 321, for example, to speed up the handover process.

Following is a description of a modular antenna array, which may be utilized by one or more of the nodes of FIGS. 1, 2, 3 and/or 4, in accordance with some demonstrative embodiments. In other embodiments, any other suitable antenna array may be used. For example, the modular antenna array may perform the functionality of antenna array 108 (FIG. 1) and/or antenna array 208 (FIG. 2). In some demonstrative embodiments, the modular antenna array may also perform shared MIMO and/or beamforming processing for a plurality of beams.

In some demonstrative embodiments, an antenna array may include a modular architecture configured to synthesize larger composite antenna arrays from smaller sub-array antenna modules. A combination of RF beamforming in the sub-array antenna modules and central beamforming between sub-array antenna modules implemented, e.g., in a baseband, an intermediate frequency and/or an RF chain, may provide, for example, increased beamforming capabilities, for example, in terms of beam width, gain, coverage and beam steering. The antenna array may be configured, for example, to operate in the mmWave region of the RF spectrum and, in particular, the 60 GHz region associated with the use of, for example, wireless personal area network (WPAN) and wireless local area network (WLAN) communication systems.

Figure 5:
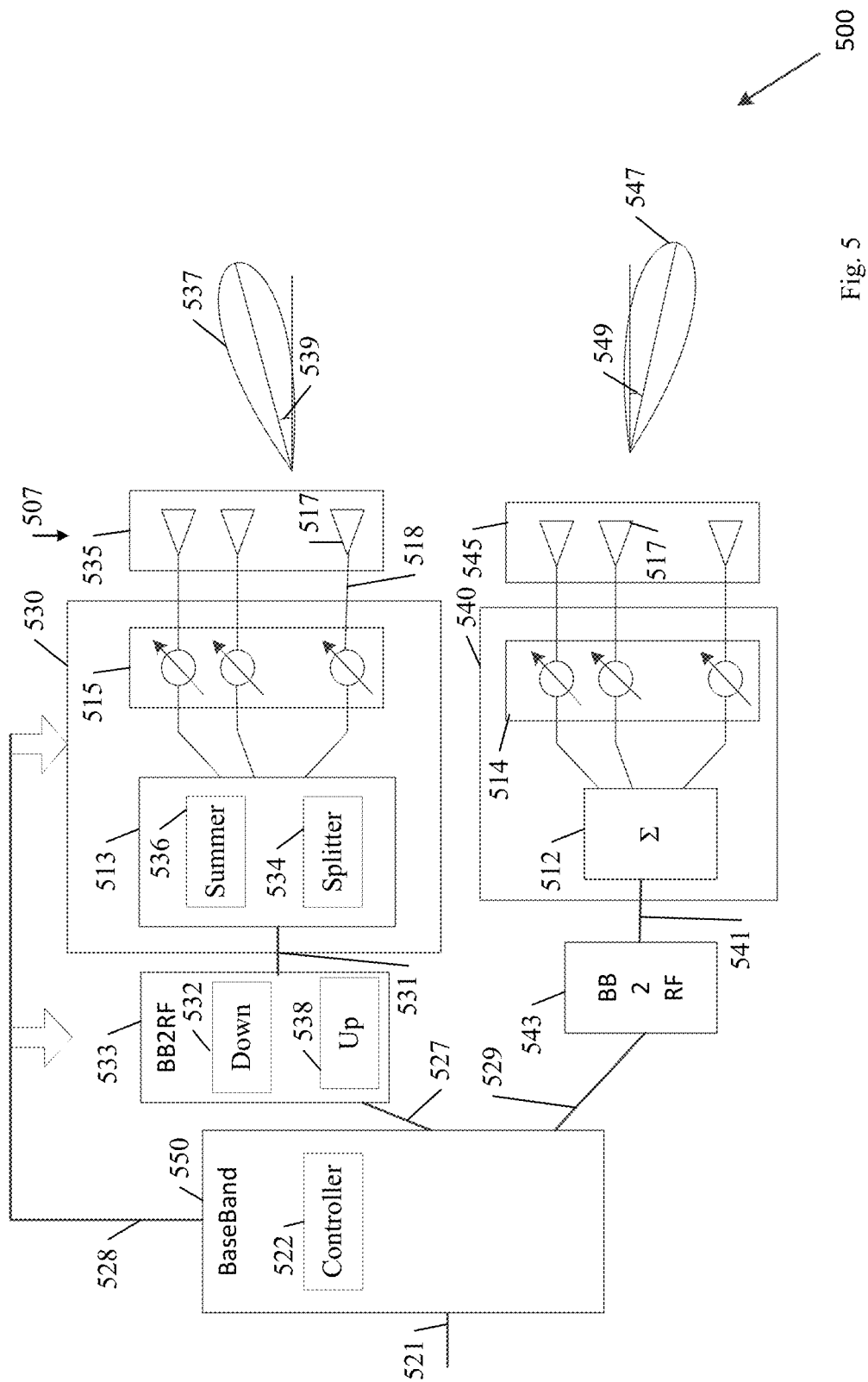
FIG. 5 is a schematic illustration of a modular antenna array, in accordance with some demonstrative embodiments.

Reference is now made to FIG. 5, which schematically illustrates a modular antenna array 500, in accordance with some demonstrative embodiments.

In some demonstrative embodiments, modular antenna array 500 may perform the functionality of antenna array 108 (FIG. 1).

In some demonstrative embodiments, modular antenna array 500 may include at least one antenna array 507 including a plurality of antenna elements 517. The plurality of antenna elements 517 may be configured, for example, for creation of a highly directional antenna pattern. The plurality of antenna elements 517 may include, for example, about 16-36 antenna elements, or any other number of antenna elements, which may be placed in a predefined geometry. The plurality of antenna elements 517 may be configured to form a plurality of highly directive antenna patterns or beams, which may be steered by setting appropriate signal phases at antenna elements 517, e.g., as described below.

In some demonstrative embodiments, antenna array 507 may include a plurality of antenna subarrays. For example, antenna array 507 may include a first antenna subarray 535, and a second antenna subarray 545. In other embodiments, antenna array 507 may include any other number of antenna subarrays, e.g., more than two antenna subarrays.

The phrase "antenna subarray" as used herein may relate to a group of antenna elements of the plurality of antenna elements 517, which may be coupled, for example, to a common RF chain. In one example, antennas 507 may include an antenna array, which may be divided into a plurality of, e.g., independent subarrays, each capable of independently generating a directional beam. In another example, antennas 507 may include a plurality of different antenna arrays to generate a plurality of directional beams. In another example, antennas 507 may include two or more different antenna arrays. One or more of the different antenna arrays may be divided into two or more subarrays.

In some demonstrative embodiments, first antenna subarray 535 may include a first plurality of antenna elements of the plurality of antenna elements 517 configured to form a first directional beam 537 directed in a first direction 539.

In some demonstrative embodiments, second antenna subarray 545 may include a second, e.g., different, plurality of antenna elements of the plurality of antenna elements 517 configured to form a second directional beam 547 directed in a second direction 549.

Some demonstrative embodiments are described herein with respect to a modular antenna array, e.g., modular antenna array 500, including two sub-arrays, e.g., antenna sub-arrays 535 and 545, configured to form two directional beams. However, in other embodiments, the modular antenna array may include any other plurality of antenna-sub-arrays to form any other plurality of directional beams.

In some demonstrative embodiments, modular antenna array 500 may include a plurality of Radio Frequency (RF) chains configured to control the first and second pluralities of antenna elements of antenna subarrays 535 and 545.

In some demonstrative embodiments, the plurality of RF chains may be coupled to the plurality of antenna subarrays. For example, modular antenna array 500 may include a first RF chain 530 connected to first antenna subarray 535, and a second RF chain 540 connected to second antenna subarray 545. In other embodiments, modular antenna array 500 may include any other number of RF chains coupled to the any other number of the plurality of antenna subarrays, e.g., more than two RF chains connected to more than two antenna subarrays.

In some demonstrative embodiments, RF chains 530 and/or 540 may include or may be included as part of a radio frequency integrated circuit (RFIC), which may be connected to antenna subarrays 535 and 545 through a plurality of feed lines 518, which may be, for example, micro-strip feed lines.

In some demonstrative embodiments, the plurality of RF chains may enable processing of two or more independent RF signals, e.g., carrying different data. For example, RF chain 530 may process an RF signal 531, and RF chain 540 may process an RF signal 541.

In some demonstrative embodiments, RF chain 530 may include a plurality of phase shifters 515 configured to adjust the phases of the antenna elements of antenna subarray 535. For example, a phase shifter of phase shifters 515 may be configured to adjust a corresponding antenna element of antenna subarray 535.

For example, phases of the antenna elements of antenna subarrays 535 may be shifted, e.g., by phase shifters 515, to provide a constructive and/or destructive interference, configured to change the beamforming scheme of antenna subarray 535 and to change the direction of directional beam 537.

In some demonstrative embodiments, RF chain 540 may include a plurality of phase shifters 514 configured to adjust the phases of the antenna elements of antenna subarray 545. For example, a phase shifter of phase shifters 514 may be configured to adjust a corresponding antenna element of antenna subarray 545.

For example, phases of the antenna elements of antenna subarrays 545 may be shifted, e.g., by phase shifters 514, to provide a constructive and/or destructive interference, configured to change the beamforming scheme of antenna subarray 545 and to change the direction of directional beam 547.

Phase shifters 515 and/or 514 may be discrete, e.g., configured to rotate the phase of the antenna elements of antenna subarrays 535 and/or 545 to a limited set of values, for example, 0, $\pm\pi/2$, and $\pi$, allowing only a relatively coarse beamforming for changing a direction of directional beams 537 and/or 547.

In some demonstrative embodiments, RF chain 530 may include a summer/splitter block 513 coupled to phase shifters 515 and/or RF chain 540 may include a summer/splitter block 512 coupled to phase shifters 514.

In some demonstrative embodiments, summer/splitter block 513 may include a splitter 534, e.g., a multiplexer, configured to reproduce and split RF signal 531 between the antenna elements of antenna subarray 535 and to couple the reproduced signals of RF signal 531 to phase shifters 515, e.g., when transmitting RF signal 531 via beam 537.

In some demonstrative embodiments, summer/splitter block 513 may include a summer 536 configured to sum into RF signal 531 signals received from the antenna elements of antenna subarray 535, e.g., when receiving RF signal 531 via beam 537.

In some demonstrative embodiments, utilizing two or more RF chains may enable baseband processing of two or more independent signals, e.g., carrying different data, communicated via two or more directional beams. In contrast, utilizing a single RF chain may enable baseband processing of only one signal, e.g., even if a large number of antenna elements 517 are utilized.

For example, RF chains 530 and 540 may enable baseband processing, e.g., independent baseband processing, of RF signals 531 and 541 communicated via directional beams 537 and 547.

In some demonstrative embodiments, modular antenna array 500 may include a baseband 550 configured to control antenna subarrays 535 and 545 to form directional beams 537 and 547 directed to directions 539 and 549 for communicating a MIMO wireless transmission.

In some demonstrative embodiments, baseband 550 may process input data 521 into the MIMO wireless transmission to be communicated utilizing a MIMO beamformed scheme, e.g., as described below.

In some demonstrative embodiments, input data 521 may include data to be communicated over one or more backhaul links, e.g., backhaul link 119 (FIG. 1), and one or more access links, e.g., access link 103 (FIG. 1).

Some demonstrative embodiments are described herein with reference to a wireless communication unit, e.g., modular antenna array 500, configured to perform both transmission and reception of a MIMO beamformed communication. Other embodiments may include a wireless communication unit capable of performing only one of transmission and reception of a MIMO beamformed communication.

In some demonstrative embodiments, modular antenna array 500 may include a plurality of baseband (BB) to RF (BB2RF) converters interfacing between the plurality of RF chains and baseband 550. For example, modular antenna array 500 may include BB2RF converters 533 interfacing between RF chain 530 and baseband 550, and BB2RF converters 543 interfacing between RF chain 540 and baseband 550. In other embodiments, modular antenna array 500 may include any other number of BB2RF converters connecting between baseband 550 and any other number of RF chains, e.g., more than two.

In some demonstrative embodiments, BB2RF converter 533 may convert RF signal 531 into baseband data signal 527 and vice versa, and/or BB2RF converters 543 may convert RF signal 541 into baseband data signal 529 and vice versa.

In one example, BB2RF converter 533 may convert RF signal 531 into baseband data signal 527, and/or BB2RF converter 543 may convert RF signal 541 into baseband data signal 529, e.g., if modular antenna array 500 receives the MIMO wireless transmission via beams 537 and/or 547.

In another example, BB2RF converter 533 may convert baseband data signal 527 into RF signal 531 and/or BB2RF converter 543 may convert baseband data signal 529 into RF signal 541, e.g., if modular antenna array 500 transmits the MIMO wireless transmission via beams 537 and/or 547.

In some demonstrative embodiments, BB2RF converters 533 and/or 543 may include down-converters, configured to convert an RF signal into a baseband data signal, and to provide the baseband data signal to baseband 550, e.g., if modular antenna array 500 receives the MIMO wireless transmission.

For example, BB2Rf converter 533 may include a down converter 532 configured to down-convert RF signal 531 into data signal 527, and to provide data signal 527 to baseband 550.

In some demonstrative embodiments, baseband to RF converters 533 and/or 543 may include up-converters, configured to convert a baseband data signal into an RF signal and to provide the RF signal to an RF chain, e.g., if modular antenna array 500 transmits the MIMO wireless transmission.

For example, BB2RF converter 533 may include an up-converter 538 configured to up-convert data signal 527 into RF signal 531 and to provide RF signal 531 to RF chain 530.

In some demonstrative embodiments, modular antenna array 500 may include a controller 522 configured to control RF Chains 535 and 545 and baseband 550 to perform the coarse beamforming and/or the fine beamforming.

In some demonstrative embodiments, controller 522 may control antenna subarrays 535 and/or 545 utilizing a control signal 528 carrying the amount of phase shift to be applied to one or more phase shifters of phase shifters 515 and/or 514.

In some demonstrative embodiments, the phase shift adjustments to phase shifters 515 may determine and/or control the beam width, gain and/or direction of directional beam 537 formed by antenna subarray 535.

In some demonstrative embodiments, the phase shift adjustments to phase shifters 514 may determine and/or control the beam width, gain and/or direction of directional beam 547 forms by antenna subarray 545.

In some demonstrative embodiments, each phase shifter of an antenna element of antenna subarrays 535 and/or 545 may perform a local phase adjustment to a signal to create a local phase distribution in a desired beam direction.

In some demonstrative embodiments, control signal 528 may include weighting coefficients, which may be generated and/or derived from controller 522, configured to steer directional beams 537 and/or 547.

In some demonstrative embodiments, controller 522 may provide via control signal 528 a first set of weighting coefficients to phase shifters 515 configured to form a local phase adjustment to one or more antenna elements of antenna subarray 535, resulting in directing beam 537 to direction 539.

In some demonstrative embodiments, controller 522 may provide via control signal 528 a second, e.g., different set of weighting coefficients, to phase shifters 514 configured to form a local phase adjustment to one or more antenna elements of antenna subarray 545, resulting in directing beam 547 to direction 549.

In some demonstrative embodiments, modular antenna array 500 may be configured to perform hybrid beamforming. The hybrid beamforming may include, for example, performing a coarse beamforming in RF chains 530 and/or 540, e.g., using phase-shifters 539 and/or 549; and fine beamforming in baseband 550, e.g., as described below.

In one example, the coarse beamforming and the fine beamforming may be performed, for example, as part of a beamforming procedure for setting up a beamformed link.

In some demonstrative embodiments, modular antenna array 500 may utilize the two or more antenna subarrays to communicate via a composite directional beam. For example, modular antenna array 500 may utilize the two or more antenna subarrays to form a composite directional beam directed in a composite beam direction.

In some demonstrative embodiments, modular antenna array 500 may utilize antenna subarrays 535 and/or 545 to operate as a composite antenna array with increased beamforming capability to form the composite directional beam. For example, the composite antenna array may have greater beamforming capabilities compared to each one of subarrays 535 and/or 545.

In one example, modular antenna array 500 may utilize the composite directional beam to communicate a high-gain directional communication. For example, modular antenna array 500 may utilize the composite directional beam for communicating data streams in a relatively large area, e.g., an outdoor area, a relatively large space, and/or for a distance greater than 50 meters.

The phrase "high-gain directional communication", as used herein may relate to a wireless communication at a gain greater than 30 Decibel isotropic (dBi), e.g., utilizing a relatively narrow steerable beam.

In some demonstrative embodiments, modular antenna array 500 may be utilized by a Transmit (TX) side and a Receive (RX) side to form directional beam 157 between the TX and RX sides.

In some demonstrative embodiments, controller 522 may utilize antenna subarrays 535 and/or 545 to form the composite directional beam. For example, modular antenna array 500 may control antenna subarray 535 to form directional beam 537 in the composite direction, and antenna subarray 545 to form directional beam 547 in the composite direction such that the composite directional beam may be formed as a combination of directional beams 537 and/or 547.

Some demonstrative embodiments are described herein with reference to a communication system, e.g., wireless communication system 500, wherein both the TX side and the RX side utilize a plurality of antenna modules to communicate via a composite directional beam. However, other embodiments may be implemented with respect to systems configured to communicate any other communication, for example, systems in which only one of the TX and RX sides utilizes a plurality of antenna subarrays, e.g., to communicate via the composite directional beam. For example, one of the TX and RX sides may utilize an omni-directional antenna, and another one of the TX and RX sides may utilize a multi-array transceiver, e.g., modular antenna array 500.

In some demonstrative embodiments, modular antenna array 500 may communicate data signal 521 via the composite directional beam formed by the combination of both directional beams 537 and 547. For example, modular antenna array 500 may distribute the same data components of data signal 521 to both signals 531 and 541, such that a data component of data signal 521 is communicated via both a first beamformed link formed by directional beam 537 generated by antenna subarray 535 in the composite direction, and a second beamformed link formed by antenna subarray 545 in the composite direction. Accordingly, the data component of data signal 521 may be communicated via the composite directional beam, which may be formed by a combination of directional beams 537 and 547.

In some demonstrative embodiments, signal 521 may include data communicated via an access link, e.g., access link 103 (FIG. 1), and a backhaul link, e.g., backhaul link 119 (FIG. 1).

In some demonstrative embodiments, each of RF signals 531 and 541 may include a combination of the data communicated via the access link, e.g., access link 103 (FIG. 1), and the data communicated via the backhaul link, e.g., backhaul link 119 (FIG. 1).

In one example, signals 531 and 541 may include components of signal 521 communicated via the composite directional beam.

In another example, signals 531 and 541 may include components of signal 521 communicated via more than one, e.g., two composite directional beams.

In some demonstrative embodiments, controller 522 may determine the first and second set of weighting coefficients to form the composite directional beam in the composite direction.

In other embodiments, controller 522 may determine the first and second set of weighting coefficients to form the two composite directional beams.

In some demonstrative embodiments, modular antenna array 500 may utilize the two or more RF chains to perform beamformed diversity communication, e.g., as described below.

The phrase "beamformed diversity communication", as used herein may relate to any communication utilizing a plurality of beams.

Some demonstrative embodiments are described herein with reference to a communication system, e.g., wireless communication system 500, wherein both the TX side and the RX side utilize a plurality of antenna subarrays to communicate a MIMO transmission. However, other embodiments may be implemented with respect to systems configured to communicate any other diversity communication, for example, systems in which only one of the Tx and Rx sides utilizes a plurality of antenna subarrays, e.g., to form a Single-Input-Multi-Output (SIMO) and/or a Multi-Input-Single-Output (MISO) beamformed link. For example, one of the Tx and Rx sides may utilize an omni-directional antenna, and another one of the Tx and Rx sides may utilize a multi-array transceiver, e.g., modular antenna array 500.

In some demonstrative embodiments, the fine beamforming may include diversity processing, e.g., MIMO processing, MISO processing and/or SIMO processing, at baseband 550, in an intermediate frequency processor and/or in RF chains. For example, the MIMO processing may include, for example, closed-loop (CL) MIMO processing, Open Loop (OL) MIMO processing, Space-Block Code (SBC) MIMO processing, e.g., Space Time Block Code (STBC) MIMO processing, Space Frequency Block Code (SFBC) MIMO processing, and the like.

In some demonstrative embodiments, modular antenna array 500 may be utilized by a node to form one or more independent directional communication beams. In one example, modular antenna array 500 may be utilized by node 101 (FIG. 1) to form directional beam 118 (FIG. 1). In another example, modular antenna array 500 may be utilized by node 101 (FIG. 1) to form both directional beam 118 (FIG. 1) and a directional beam for communicating over backhaul link 119.

In some demonstrative embodiments, a plurality of different signals may be communicated via a plurality of beamformed beams. Each beamformed beam, which corresponds to an antenna subarray of the plurality of antenna subarrays, may communicate a signal, for example, via a plurality of antenna elements of the antenna subarray.

For example, a first signal, e.g., signal 527, may be communicated via directional beam 537 generated by antenna subarray 535, and a second, e.g., different signal, for example, signal 529, may be communicated via directional beam 547 generated by antenna subarray 545.

Figure 6:
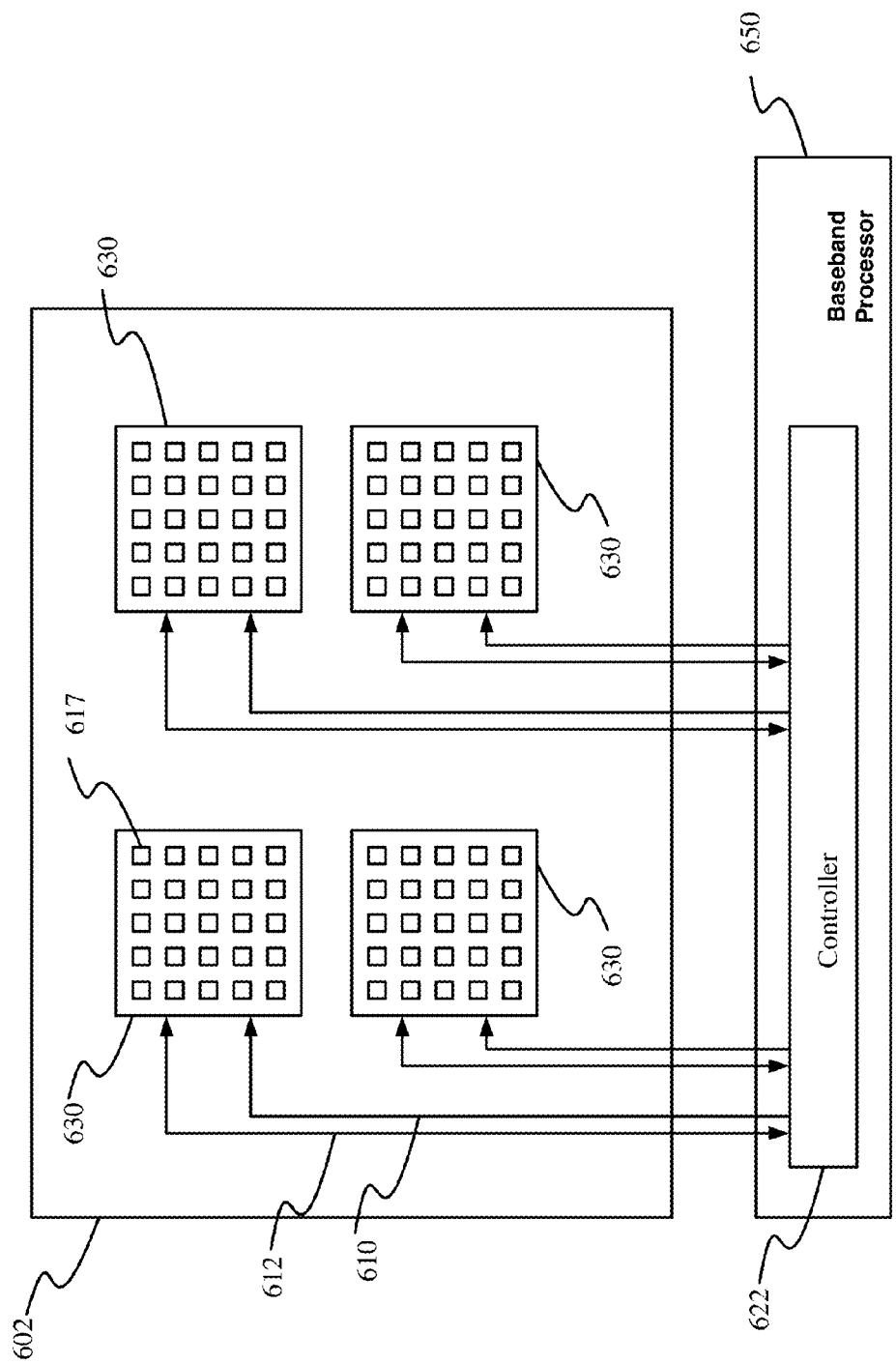
FIG. 6 is a schematic illustration of a planar modular antenna array, in accordance with some demonstrative embodiments.

Reference is now made to FIG. 6, which schematically illustrates a planar modular antenna array 602, in accordance with some demonstrative embodiments. For example, planar antenna array 602 may perform the functionality of modular antenna array 500 (FIG. 5).

In some demonstrative embodiments, planar antenna array 602 may include a planar array of antenna modules 630, e.g., arranged in a two-dimensional array. For example, antenna modules 630 may be arranged in one or more rows, e.g., two rows, and one or more columns, e.g., two columns.

In some demonstrative embodiments, an antenna module 630 may include a plurality of antenna elements 617, e.g., including antenna elements 517 (FIG. 5).

In some demonstrative embodiments, antenna elements 617 of an antenna module 630 may be arranged in a two-dimensional array. For example, antenna elements 617 of the antenna module 630 may be arranged in one or more rows, e.g., two or more rows, and one or more columns, e.g., two or more columns.

In some demonstrative embodiments, antenna module 630 may also include an RF chain, e.g., RF chain 530 (FIG. 5) or RF chain 540 (FIG. 5), to control antenna elements 617, e.g., as described above with reference to FIG. 5.

For example, antenna modules 630 may be controlled by a controller 622 via control links 610. Controller 622 may be implemented, for example, as part of a BB 650. For example, controller 620 may perform the functionality of controller 522 (FIG. 5) and/or BB 650 may perform the functionality of BB 550 (FIG. 5). Data links 612 may transfer data signals between BB 650 and modules 630. For example, control links 610 may transfer control signals 528 (FIG. 5), and/or data links may transfer data signals 527 and/or 529 (FIG. 5).

In some demonstrative embodiments, the planar arrangement of antenna modules 630 and the planar arrangement of antenna elements 617 may be advantageous, for example, for beam steering in two dimensions, e.g., azimuth and elevation and/or any other dimensions.

In one example, planar modular antenna array 602 may perform the functionality of antenna 108 (FIG. 1). For example, node 101 (FIG. 1) may utilize the planar arrangement of antenna modules 630 and the planar arrangement of antenna elements 617 of antennas modules 630 to steer the elevation angle and/or the azimuth angle of directional beam 118 (FIG. 1).

Figure 7:
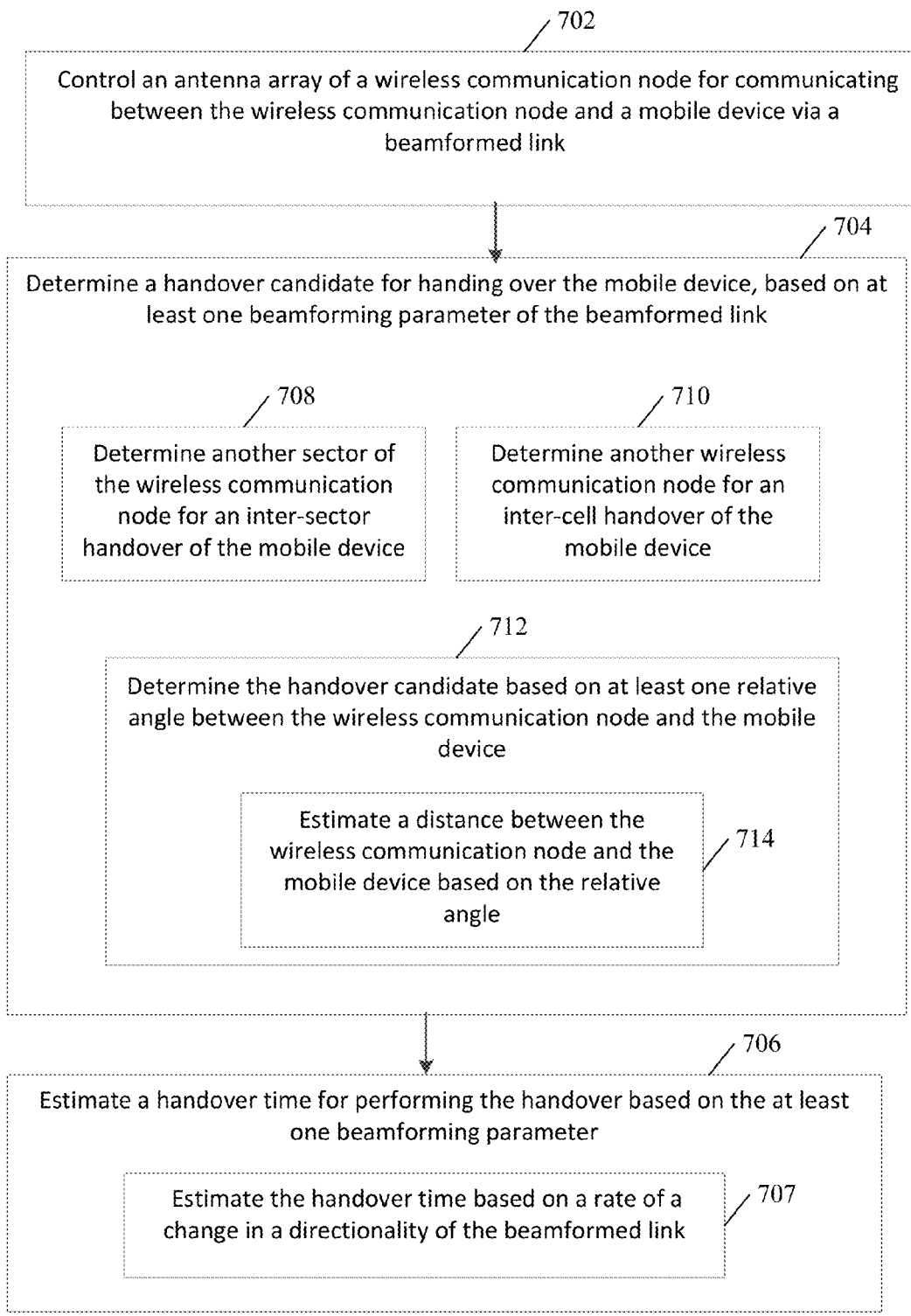
FIG. 7 is a schematic flow-chart illustration of a method of handover of a beamformed link, in accordance with some demonstrative embodiments.

Reference is now made to FIG. 7, which schematically illustrates a method of handover of a wireless beamformed link, in accordance with some demonstrative embodiments. For example, one or more of the operations of the method of FIG. 7 may be performed by a wireless communication system, e.g., system 100 (FIG. 1); a wireless communication node, e.g., node 101 (FIG. 1); and/or a wireless communication unit, e.g., wireless communication unit 110 (FIG. 1).

As indicated at block 702, the method may include controlling an antenna array of a wireless communication node for communicating between a wireless communication node and a mobile device via a beamformed link. For example, wireless communication unit 110 (FIG. 1) may control antenna array 108 (FIG. 1) for communicating over access link 103 (FIG. 1) between wireless communication node 101 (FIG. 1) and mobile device 140 (FIG. 1), e.g., as described above.

As indicated at block 704, the method may include determining a handover candidate for handing over the mobile device, based on at least one beamforming parameter of the beamformed link. For example, wireless communication unit 110 (FIG. 1) may determine a handover candidate for handing over mobile device 140 (FIG. 1), based on at least one beamforming parameter of beamformed link 103 (FIG. 1), e.g., as described above.

As indicated at block 706, the method may include estimating a handover time for performing the handover based on the at least one beamforming parameter. For example, wireless communication unit 110 (FIG. 1) may estimate the handover time for performing the handover based on the at least one beamforming parameter of link 103 (FIG. 1), e.g., as described above.

As indicated at block 707, estimating the handover time for performing the handover may include estimating the handover time based on a rate of a change in a directionality of the beamformed link. For example, wireless communication unit 110 (FIG. 1) may estimate the handover time for performing the handover based on the rate of change of an azimuth and/or elevation of directional beam 118 (FIG. 1), e.g., as described above.

As indicated at block 708, determining the handover candidate may include determining another sector of the wireless communication node for an inter-sector handover of the mobile device. For example, wireless communication unit 110 (FIG. 1) may determine a sector of antennas 108 (FIG. 1) as the candidate for handing over mobile device 140 (FIG. 1), e.g., as described above.

As indicated at block 710, determining the handover candidate may include determining another wireless communication node for an inter-cell handover of the mobile device. For example, wireless communication unit 110 (FIG. 1) may determine node 150 (FIG. 1) as the candidate for handing over mobile device 140 (FIG. 1), e.g., as described above.

As indicated at block 712, determining the handover candidate may include determining the handover candidate based on at least one relative angle between the wireless communication node and the mobile device. For example, wireless communication unit 110 (FIG. 1) may determine the handover candidate based on azimuth angle 315 (FIG. 3) and/or elevation angle 415 (FIG. 4), e.g., as described above.

As indicated at block 714, determining the handover candidate may include estimating a distance between the wireless communication node and the mobile device based on the relative angle, and based on the distance to determine the handover candidate. For example, wireless communication unit 110 (FIG. 1) may estimate the distance 417 (FIG. 4) based on elevation angle 415 (FIG. 4), and may determine the handover candidate, e.g., node 320 (FIG. 3), based on distance 417 (FIG. 4), e.g., as described above.

Figure 8:
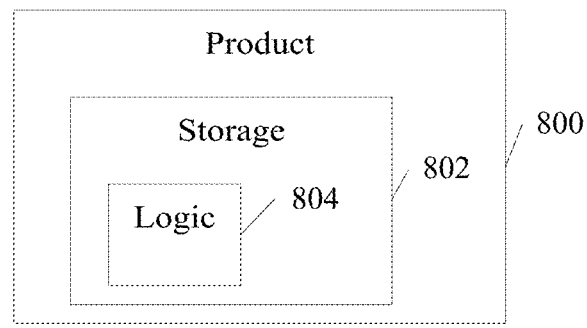
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of wireless communication node 101 (FIG. 1), wireless communication unit 110 (FIG. 1), wireless communication nodes 310, 320 and/or 330 (FIG. 3) and/or wireless communication node 410 (FIG. 4), and/or to perform one or more operations of the method of FIG. 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a wireless communication unit to communicate between a wireless communication node and a mobile device via a beamformed link between the wireless communication node and the mobile device, the wireless communication unit is to determine a handover candidate for handing over the mobile device, based on at least one beamforming parameter of the beamformed link.

Example 2 includes the subject matter of Example 1 and optionally, wherein the at least one beamforming parameter comprises at least one directionality parameter corresponding to a directionality of the beamformed link.

Example 3 includes the subject matter of Example 2 and optionally, wherein the at least one directionality parameter comprises at least one angle parameter selected from the group consisting of an azimuth angle of the beamformed link and an elevation angle of the beamformed link.

Example 4 includes the subject matter of Example 2 or 3 and optionally, wherein the wireless communication unit is to determine the handover candidate based on a direction of a change in the directionality parameter.

Example 5 includes the subject matter of any one of Examples 1-4 and optionally, wherein the wireless communication unit is to determine at least one relative-placement parameter relating to a relative placement between the wireless communication node and the mobile device based on the beamforming parameter, and to determine the handover candidate based on the at least one relative-placement parameter.

Example 6 includes the subject matter of Example 5 and optionally, wherein the at least one relative-placement parameter comprises at least one relative angle between the wireless communication node and the mobile device.

Example 7 includes the subject matter of Example 6 and optionally, wherein the at least one relative angle comprises at least one angle selected from the group consisting of an azimuth angle and an elevation angle.

Example 8 includes the subject matter of Example 6 or 7 and optionally, wherein the wireless communication unit is to determine an estimated distance between the wireless communication node and the mobile device based on the relative angle.

Example 9 includes the subject matter of any one of Examples 1-8 and optionally, wherein the beamformed link comprises a beamformed link formed by a first sector of an antenna array of the wireless communication node, and wherein the handover candidate comprises a second sector of the antenna array for an inter-sector handover of the mobile device.

Example 10 includes the subject matter of Example 9 and optionally, wherein the wireless communication unit is to determine the second sector based on a change in at least one angle of the beamformed link.

Example 11 includes the subject matter of any one of Examples 1-8 and optionally, wherein the handover candidate comprises another wireless communication node.

Example 12 includes the subject matter of Example 11 and optionally, wherein the wireless communication unit is to inform the other wireless communication node that beamforming training is to be performed between the mobile device and the other wireless communication node.

Example 13 includes the subject matter of any one of Examples 1-12 and optionally, wherein the wireless communication unit is to estimate a handover time for performing the handover based on the at least one beamforming parameter.

Example 14 includes the subject matter of Example 13 and optionally, wherein the wireless communication unit is to estimate the handover time for performing the handover based on a rate of a change in a directionality of the beamformed link.

Example 15 includes the subject matter of Example 13 or 14 and optionally, wherein the wireless communication unit is to estimate the handover time for performing the handover based on a rate of a change in at least one angle of the beamformed link.

Example 16 includes the subject matter of any one of Examples 1-15 and optionally, wherein the wireless communication unit is to initialize the handover to the handover candidate.

Example 17 includes the subject matter of any one of Examples 1-16 and optionally, wherein the wireless communication node comprises a base station.

Example 18 includes the subject matter of any one of Examples 1-17 and optionally, wherein the beamformed link comprises a link over a millimeter-Wave (mmWave) frequency band.

Example 19 includes a system of wireless communication, the system comprising at least one wireless communication node to communicate with one or more mobile devices of a wireless communication cell, the wireless communication node comprising an antenna array; and a wireless communication unit to control the antenna array for communicating with a mobile device via a beamformed link, the wireless communication unit is to determine a handover candidate for handing over the mobile device, based on at least one beamforming parameter of the beamformed link.

Example 20 includes the subject matter of Example 19 and optionally, wherein the at least one beamforming parameter comprises at least one directionality parameter corresponding to a directionality of the beamformed link.

Example 21 includes the subject matter of Example 20 and optionally, wherein the at least one directionality parameter comprises at least one angle parameter selected from the group consisting of an azimuth angle of the beamformed link and an elevation angle of the beamformed link.

Example 22 includes the subject matter of Example 20 or 21 and optionally, wherein the wireless communication unit is to determine the handover candidate based on a direction of a change in the directionality parameter.

Example 23 includes the subject matter of any one of Examples 19-23 and optionally, wherein the wireless communication unit is to determine at least one relative-placement parameter relating to a relative placement between the wireless communication node and the mobile device based on the beamforming parameter, and to determine the handover candidate based on the at least one relative-placement parameter.

Example 24 includes the subject matter of Example 23 and optionally, wherein the at least one relative-placement parameter comprises at least one relative angle between the wireless communication node and the mobile device.

Example 25 includes the subject matter of Example 24 and optionally, wherein the at least one relative angle comprises at least one angle selected from the group consisting of an azimuth angle and an elevation angle.

Example 26 includes the subject matter of Example 24 or 25 and optionally, wherein the wireless communication unit is to determine an estimated distance between the wireless communication node and the mobile device based on the relative angle.

Example 27 includes the subject matter of any one of Examples 19-26 and optionally, wherein the beamformed link comprises a beamformed link formed by a first sector of the antenna array, and wherein the handover candidate comprises a second sector of the antenna array for an inter-sector handover of the mobile device.

Example 28 includes the subject matter of Example 27 and optionally, wherein the wireless communication unit is to determine the second sector based on a change in at least one angle of the beamformed link.

Example 29 includes the subject matter of any one of Examples 19-26 and optionally, wherein the handover candidate comprises another wireless communication node.

Example 30 includes the subject matter of Example 29 and optionally, wherein the wireless communication unit is to inform the other wireless communication node that beamforming training is to be performed between the mobile device and the other wireless communication node.

Example 31 includes the subject matter of Example 29 or 30 and optionally, wherein the wireless communication unit is to control the antenna array to communicate with the other wireless communication node via a beamformed backhaul link.

Example 32 includes the subject matter of any one of Examples 19-31 and optionally, wherein the wireless communication unit is to estimate a handover time for performing the handover based on the at least one beamforming parameter.

Example 33 includes the subject matter of Example 32 and optionally, wherein the wireless communication unit is to estimate the handover time for performing the handover based on a rate of a change in a directionality of the beamformed link.

Example 34 includes the subject matter of Example 32 or 33 and optionally, wherein the wireless communication unit is to estimate the handover time for performing the handover based on a rate of a change in at least one angle of the beamformed link.

Example 35 includes the subject matter of any one of Examples 19-34 and optionally, wherein the wireless communication unit is to initialize the handover to the handover candidate.

Example 36 includes the subject matter of any one of Examples 19-35 and optionally, wherein the wireless communication node comprises a base station.

Example 37 includes the subject matter of any one of Examples 19-36 and optionally, wherein the beamformed link comprises a link over a millimeter-Wave (mmWave) frequency band.

Example 38 includes a product including a non-transitory storage medium having stored thereon instructions that, when executed by a machine, result in controlling an antenna array of a wireless communication node for communicating between the wireless communication node and a mobile device via a beamformed link; and determining a handover candidate for handing over the mobile device, based on at least one beamforming parameter of the beamformed link.

Example 39 includes the subject matter of Example 38 and optionally, wherein the at least one beamforming parameter comprises at least one directionality parameter corresponding to a directionality of the beamformed link.

Example 40 includes the subject matter of Example 39 and optionally, wherein the at least one directionality parameter comprises at least one angle parameter selected from the group consisting of an azimuth angle of the beamformed link and an elevation angle of the beamformed link.

Example 41 includes the subject matter of Example 38 or 39 and optionally, wherein the instructions result in determining the handover candidate based on a direction of a change in the directionality parameter.

Example 42 includes the subject matter of any one of Examples 38-41 and optionally, wherein the instructions result in determining at least one relative-placement parameter relating to a relative placement between the wireless communication node and the mobile device based on the beamforming parameter, and determining the handover candidate based on the at least one relative-placement parameter.

Example 43 includes the subject matter of Example 42 and optionally, wherein the at least one relative-placement parameter comprises at least one relative angle between the wireless communication node and the mobile device.

Example 44 includes the subject matter of Example 43 and optionally, wherein the at least one relative angle comprises at least one angle selected from the group consisting of an azimuth angle and an elevation angle.

Example 45 includes the subject matter of Example 43 or 44 and optionally, wherein the instructions result in determining an estimated distance between the wireless communication node and the mobile device based on the relative angle.

Example 46 includes the subject matter of any one of Examples 38-45 and optionally, wherein the beamformed link comprises a beamformed link formed by a first sector of an antenna array of the wireless communication node, and wherein the handover candidate comprises a second sector of the antenna array for an inter-sector handover of the mobile device.

Example 47 includes the subject matter of Example 46 and optionally, wherein the instructions result in determining the second sector based on a change in at least one angle of the beamformed link.

Example 48 includes the subject matter of any one of Examples 38-45 and optionally, wherein the handover candidate comprises another wireless communication node.

Example 49 includes the subject matter of Example 48 and optionally, wherein the instructions result in informing the other wireless communication node that beamforming training is to be performed between the mobile device and the other wireless communication node.

Example 50 includes the subject matter of any one of Examples 38-49 and optionally, wherein the instructions result in estimating a handover time for performing the handover based on the at least one beamforming parameter.

Example 51 includes the subject matter of Example 50 and optionally, wherein the instructions result in estimating the handover time for performing the handover based on a rate of a change in a directionality of the beamformed link.

Example 52 includes the subject matter of Example 50 or 51 and optionally, wherein the instructions result in estimating the handover time for performing the handover based on a rate of a change in at least one angle of the beamformed link.

Example 53 includes the subject matter of any one of Examples 38-52 and optionally, wherein the instructions result in initializing the handover to the handover candidate.

Example 54 includes the subject matter of any one of Examples 38-53 and optionally, wherein the wireless communication node comprises a base station.

Example 55 includes the subject matter of any one of Examples 38-54 and optionally, wherein the beamformed link comprises a link over a millimeter-Wave (mmWave) frequency band.

Example 56 includes a method of wireless communication, the method comprising controlling an antenna array of a wireless communication node for communicating between the wireless communication node and a mobile device via a beamformed link; and determining a handover candidate for handing over the mobile device, based on at least one beamforming parameter of the beamformed link.

Example 57 includes the subject matter of Example 56 and optionally, wherein the at least one beamforming parameter comprises at least one directionality parameter corresponding to a directionality of the beamformed link.

Example 58 includes the subject matter of Example 57 and optionally, wherein the at least one directionality parameter comprises at least one angle parameter selected from the group consisting of an azimuth angle of the beamformed link and an elevation angle of the beamformed link.

Example 59 includes the subject matter of Example 57 or 58 and optionally comprising determining the handover candidate based on a direction of a change in the directionality parameter.

Example 60 includes the subject matter of any one of Examples 56-59 and optionally comprising determining at least one relative-placement parameter relating to a relative placement between the wireless communication node and the mobile device based on the beamforming parameter, and determining the handover candidate based on the at least one relative-placement parameter.

Example 61 includes the subject matter of Example 60 and optionally, wherein the at least one relative-placement parameter comprises at least one relative angle between the wireless communication node and the mobile device.

Example 62 includes the subject matter of Example 61 and optionally, wherein the at least one relative angle comprises at least one angle selected from the group consisting of an azimuth angle and an elevation angle.

Example 63 includes the subject matter of Example 61 or 62 and optionally comprising determining an estimated distance between the wireless communication node and the mobile device based on the relative angle.

Example 64 includes the subject matter of any one of Examples 56-63 and optionally, wherein the beamformed link comprises a beamformed link formed by a first sector of an antenna array of the wireless communication node, and wherein the handover candidate comprises a second sector of the antenna array for an inter-sector handover of the mobile device.

Example 65 includes the subject matter of Example 64 and optionally comprising determining the second sector based on a change in at least one angle of the beamformed link.

Example 66 includes the subject matter of any one of Examples 56-63 and optionally, wherein the handover candidate comprises another wireless communication node.

Example 67 includes the subject matter of Example 66 and optionally comprising informing the other wireless communication node that beamforming training is to be performed between the mobile device and the other wireless communication node.

Example 68 includes the subject matter of any one of Examples 56-67 and optionally comprising estimating a handover time for performing the handover based on the at least one beamforming parameter.

Example 69 includes the subject matter of Example 68 and optionally comprising estimating the handover time for performing the handover based on a rate of a change in a directionality of the beamformed link.

Example 70 includes the subject matter of Example 68 or 69 and optionally comprising estimating the handover time for performing the handover based on a rate of a change in at least one angle of the beamformed link.

Example 71 includes the subject matter of any one of Examples 56-70 and optionally comprising initializing the handover to the handover candidate.

Example 72 includes the subject matter of any one of Examples 56-71 and optionally, wherein the wireless communication node comprises a base station.

Example 73 includes the subject matter of any one of Examples 56-72 and optionally, wherein the beamformed link comprises a link over a millimeter-Wave (mmWave) frequency band.

Example 74 includes an apparatus of wireless communication, the apparatus comprising: means for controlling an antenna array of a wireless communication node for communicating between the wireless communication node and a mobile device via a beamformed link; and means for determining a handover candidate for handing over the mobile device, based on at least one beamforming parameter of the beamformed link.

Example 75 includes the subject matter of Example 74 and optionally, wherein the at least one beamforming parameter comprises at least one directionality parameter corresponding to a directionality of the beamformed link.

Example 76 includes the subject matter of Example 75 and optionally, wherein the at least one directionality parameter comprises at least one angle parameter selected from the group consisting of an azimuth angle of the beamformed link and an elevation angle of the beamformed link.

Example 77 includes the subject matter of Example 74 or 75 and optionally comprising means for determining the handover candidate based on a direction of a change in the directionality parameter.

Example 78 includes the subject matter of any one of Examples 74-77 and optionally comprising means for determining at least one relative-placement parameter relating to a relative placement between the wireless communication node and the mobile device based on the beamforming parameter, and determining the handover candidate based on the at least one relative-placement parameter.

Example 79 includes the subject matter of Example 78 and optionally, wherein the at least one relative-placement parameter comprises at least one relative angle between the wireless communication node and the mobile device.

Example 80 includes the subject matter of Example 79 and optionally, wherein the at least one relative angle comprises at least one angle selected from the group consisting of an azimuth angle and an elevation angle.

Example 81 includes the subject matter of Example 78 or 79 and optionally comprising means for determining an estimated distance between the wireless communication node and the mobile device based on the relative angle.

Example 82 includes the subject matter of any one of Examples 74-81 and optionally, wherein the beamformed link comprises a beamformed link formed by a first sector of an antenna array of the wireless communication node, and wherein the handover candidate comprises a second sector of the antenna array for an inter-sector handover of the mobile device.

Example 83 includes the subject matter of Example 82 and optionally comprising means for determining the second sector based on a change in at least one angle of the beamformed link.

Example 84 includes the subject matter of any one of Examples 74-81 and optionally, wherein the handover candidate comprises another wireless communication node.

Example 85 includes the subject matter of Example 84 and optionally comprising means for informing the other wireless communication node that beamforming training is to be performed between the mobile device and the other wireless communication node.

Example 86 includes the subject matter of any one of Examples 74-85 and optionally comprising means for estimating a handover time for performing the handover based on the at least one beamforming parameter.

Example 87 includes the subject matter of Example 86 and optionally comprising means for estimating the handover time for performing the handover based on a rate of a change in a directionality of the beamformed link.

Example 88 includes the subject matter of Example 86 or 87 and optionally comprising means for estimating the handover time for performing the handover based on a rate of a change in at least one angle of the beamformed link.

Example 89 includes the subject matter of any one of Examples 74-88 and optionally comprising means for initializing the handover to the handover candidate.

Example 90 includes the subject matter of any one of Examples 74-89 and optionally, wherein the wireless communication node comprises a base station.

Example 91 includes the subject matter of any one of Examples 74-90 and optionally, wherein the beamformed link comprises a link over a millimeter-Wave (mmWave) frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a wireless communication unit configured to control steering of a directional beam formed by an antenna array of a wireless communication node by adjusting phase shifts to be applied to antenna elements of the antenna array, the directional beam to allow communication between said wireless communication node and a mobile device via a beamformed link between the wireless communication node and the mobile device, said wireless communication unit is to control steering of the directional beam in a direction of movement of the mobile device, the wireless communication unit is configured to determine that the mobile device is to move out of a coverage of the directional beam, and to determine a handover candidate for handing over the mobile device, based on at least one angle of the directional beam.

2. The apparatus of claim 1, wherein said wireless communication unit is to determine said handover candidate based on a comparison between the angle of said directional beam, and an angle between said wireless communication node and said handover candidate.

3. The apparatus of claim 1, wherein said at least one angle comprises at least one angle selected from a group consisting of an azimuth angle of said directional beam and an elevation angle of said directional beam.

4. The apparatus of claim 1, wherein said wireless communication unit is to determine said handover candidate based on a direction of a change in said angle.

5. The apparatus of claim 1, wherein said wireless communication unit is to determine said handover candidate based on an estimated distance between the wireless communication node and the mobile device.

6. The apparatus of claim 5, wherein said wireless communication unit is to determine said estimated distance based on an elevation angle of said directional beam.

7. The apparatus of claim 1, wherein said wireless communication unit is to determine said handover candidate based on an azimuth angle of said directional beam.

8. The apparatus of claim 5, wherein said wireless communication unit is to determine said estimated distance based on a height of said wireless communication node.

9. The apparatus of claim 1, wherein said beamformed link comprises a beamformed link formed by a first sector of the antenna array, and wherein said handover candidate comprises a second sector of said antenna array for an inter-sector handover of said mobile device.

10. The apparatus of claim 9, wherein said wireless communication unit is to determine said second sector based on a change in the at least one angle of said directional beam.

11. The apparatus of claim 1, wherein said handover candidate comprises another wireless communication node.

12. The apparatus of claim 11, wherein said wireless communication unit is to inform the other wireless communication node that beamforming training is to be performed between the mobile device and the other wireless communication node.

13. The apparatus of claim 1, wherein said wireless communication unit is to estimate a handover time for performing said handover based on said at least one angle.

14. The apparatus of claim 13, wherein said wireless communication unit is to estimate the handover time for performing said handover based on a rate of a change in said angle.

15. The apparatus of claim 13, wherein said wireless communication unit is to estimate the handover time for performing said handover based on a rate of a change in the at least one angle of said directional beam.

16. The apparatus of claim 1, wherein said wireless communication unit is to initialize said handover to said handover candidate.

17. The apparatus of claim 1, wherein said wireless communication node comprises a base station.

18. The apparatus of claim 1, wherein said beamformed link comprises a link over a millimeter-Wave (mmWave) frequency band.

19. A system of wireless communication, said system comprising:
at least one wireless communication node to communicate with one or more mobile devices of a wireless communication cell, said wireless communication node comprising:
an antenna array; and
a wireless communication unit configured to control steering of a directional beam formed by said antenna array by adjusting phase shifts to be applied to antenna elements of the antenna array, the directional beam to allow communication between said wireless communication node and a mobile device via a beamformed link between the wireless communication node and the mobile device, said wireless communication unit is to control steering of the directional beam in a direction of movement of the mobile device, the wireless communication unit is configured to determine that the mobile device is to move out of a coverage of the directional beam, and to determine a handover candidate for handing over the mobile device, based on at least one angle of the directional beam.

20. The system of claim 19, wherein said wireless communication unit is to determine said handover candidate based on a comparison between the angle of said directional beam, and an angle between said wireless communication node and said handover candidate.

21. The system of claim 19, wherein said wireless communication unit is to determine said handover candidate based on an estimated distance between the wireless communication node and the mobile device.

22. The system of claim 19, wherein said beamformed link comprises a beamformed link formed by a first sector of said antenna array, and wherein said handover candidate comprises a second sector of said antenna array for an inter-sector handover of said mobile device.

23. The system of claim 19, wherein said handover candidate comprises another wireless communication node.

24. The system of claim 19, wherein said wireless communication unit is to estimate a handover time for performing said handover based on said at least one angle.

25. A product including a non-transitory storage medium having stored thereon instructions that, when executed by a machine, result in:
controlling steering of a directional beam formed by an antenna array of a wireless communication node by adjusting phase shifts to be applied to antenna elements of the antenna array, the directional beam to allow communication between the wireless communication node and a mobile device via a beamformed link between the wireless communication node and the mobile device, said controlling steering of the directional beam is based on a direction of movement of the mobile device; and
when determining that the mobile device is to move out of a coverage of the directional beam, determining a handover candidate for handing over the mobile device, based on at least one angle of the directional beam.

26. The product of claim 25, wherein said instructions result in determining said handover candidate based on a comparison between the angle of said directional beam, and an angle between said wireless communication node and said handover candidate.

27. The product of claim 25, wherein said beamformed link comprises a beamformed link formed by a first sector of the antenna array, and wherein said handover candidate comprises a second sector of said antenna array for an inter-sector handover of said mobile device.

28. The product of claim 25, wherein said handover candidate comprises another wireless communication node.

29. A method comprising:
controlling steering of a directional beam formed by an antenna array of a wireless communication node by adjusting phase shifts to be applied to antenna elements of the antenna array, the directional beam to allow communication between the wireless communication node and a mobile device via a beamformed link between the wireless communication node and the mobile device, said controlling steering of the directional beam is based on a direction of movement of the mobile device; and
when determining that the mobile device is to move out of a coverage of the directional beam, determining a handover candidate for handing over the mobile device, based on at least one angle of the directional beam.

30. The method of claim 29 comprising estimating a handover time for performing said handover based on said angle.

* * * * *